(12) United States Patent
Pack et al.

(10) Patent No.: US 11,832,711 B2
(45) Date of Patent: Dec. 5, 2023

(54) COSMETIC DISPENSER AND METHOD FOR OPERATING SAME

(71) Applicant: LG HOUSEHOLD & HEALTH CARE LTD., Seoul (KR)

(72) Inventors: Bok Hyun Pack, Seoul (KR); Seong Eun Koo, Daejeon (KR); Kwang Ho Oh, Seoul (KR); Hae Young Hwang, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 0 days.

(21) Appl. No.: 17/743,150

(22) Filed: May 12, 2022

(65) Prior Publication Data

US 2022/0265029 A1      Aug. 25, 2022

Related U.S. Application Data

(62) Division of application No. 16/613,279, filed as application No. PCT/KR2017/011749 on Oct. 24, 2017.

(30) Foreign Application Priority Data

May 22, 2017      (KR) .......................... 10-2017-0062740

(51) Int. Cl.
   *A45D 44/00*        (2006.01)
   *G06K 7/10*         (2006.01)
   (Continued)

(52) U.S. Cl.
   CPC ........ *A45D 44/005* (2013.01); *B01F 33/8442* (2022.01); *G06K 7/1097* (2013.01);
   (Continued)

(58) Field of Classification Search
   CPC ............ A45D 44/005; A45D 2044/007; A45D 2200/057; G06K 7/1097; G06K 7/1417; B01F 33/8442
   See application file for complete search history.

(56) References Cited

U.S. PATENT DOCUMENTS

5,903,465 A     5/1999  Brown
6,412,658 B1 *  7/2002  Bartholomew ....... B01F 33/841
                                               222/144.5
(Continued)

FOREIGN PATENT DOCUMENTS

CN      101032394 A     9/2007
CN      103198570 A     7/2013
(Continued)

OTHER PUBLICATIONS

Bibliographic Data of ZA-946411-B, dated Feb. 23, 1996.
(Continued)

*Primary Examiner* — Michael Collins
(74) *Attorney, Agent, or Firm* — Birch, Stewart, Kolasch & Birch, LLP

(57) ABSTRACT

A cosmetic dispenser includes a communication unit, a control unit for acquiring at least one of user information and environment information through the communication unit and acquiring a cosmetic dispensing method based on at least one of the user information and the environment information, and a cosmetic dispensing unit having a plurality of cartridges for containing cosmetics and a discharge unit for discharging the cosmetics contained in the plurality of cartridges. The control unit receives input information in which an amount of cosmetics to be provided is selected by either a number of times of use or a period of use. The cosmetic dispensing unit dispenses each of the cosmetics contained in the plurality of cartridges in an amount corre-
(Continued)

sponding to the number of times of use or the period of use selected according to the input information.

20 Claims, 21 Drawing Sheets

(51) Int. Cl.
  *G06K 7/14* (2006.01)
  *B01F 33/84* (2022.01)
(52) U.S. Cl.
  CPC ...... *G06K 7/1417* (2013.01); *A45D 2044/007* (2013.01); *A45D 2200/057* (2013.01)

(56) References Cited

U.S. PATENT DOCUMENTS

| | | | |
|---|---|---|---|
| 6,510,366 B1 | 1/2003 | Murray et al. | |
| 6,856,861 B2 | 2/2005 | Dirksing et al. | |
| 7,295,889 B2* | 11/2007 | Lahteenmaki | G16H 20/60 |
| | | | 700/239 |
| 7,624,769 B2 | 12/2009 | Bartholomew et al. | |
| 8,593,634 B1 | 11/2013 | Igarashi | |
| 8,688,268 B2 | 4/2014 | Samain et al. | |
| 8,977,389 B2* | 3/2015 | Witchell | A45D 44/005 |
| | | | 700/233 |
| 9,808,071 B2 | 11/2017 | Thiebaut et al. | |
| 9,968,177 B2 | 5/2018 | Thiebaut et al. | |
| 10,010,155 B2 | 7/2018 | Ajiki et al. | |
| 10,213,007 B2 | 2/2019 | Lucet-Levannier et al. | |
| 10,512,358 B1* | 12/2019 | Perrelli | A45F 3/18 |
| 10,592,932 B2 | 3/2020 | Gu et al. | |
| 10,849,832 B2* | 12/2020 | Belkhir | B01F 33/8442 |
| 11,076,683 B2* | 8/2021 | Wiltord | G06F 3/0482 |
| 11,136,233 B2* | 10/2021 | Belkhir | B01F 35/714112 |
| 11,160,353 B2* | 11/2021 | Belkhir | G07F 17/0092 |
| 2002/0179639 A1* | 12/2002 | Bartholomew | A45D 44/00 |
| | | | 222/144.5 |
| 2004/0041858 A1 | 3/2004 | Lapstun et al. | |
| 2008/0047972 A1 | 2/2008 | Bartholomew et al. | |
| 2011/0220139 A1 | 9/2011 | Samain | |
| 2011/0247718 A1 | 10/2011 | Samain | |
| 2012/0048880 A1* | 3/2012 | Damolaris | A45D 44/02 |
| | | | 222/25 |
| 2014/0081463 A1 | 3/2014 | Igarashi | |
| 2015/0021356 A1* | 1/2015 | Witchell | B01F 33/848 |
| | | | 222/23 |
| 2016/0107133 A1 | 4/2016 | Sugino et al. | |
| 2016/0331308 A1 | 11/2016 | Zhou | |
| 2017/0208920 A1 | 7/2017 | Thiebaut et al. | |
| 2018/0042361 A1 | 2/2018 | Giron et al. | |
| 2021/0127811 A1 | 5/2021 | Puls et al. | |

FOREIGN PATENT DOCUMENTS

| | | |
|---|---|---|
| CN | 105678561 A | 6/2016 |
| JP | 2003-534085 A | 11/2003 |
| JP | 2010-86036 A | 4/2010 |
| JP | 2012-506287 A | 3/2012 |
| JP | 2014-183917 A | 10/2014 |
| JP | 2015-510405 A | 4/2015 |
| JP | 2015-531272 A | 11/2015 |
| KR | 10-2006-0109797 A | 10/2006 |
| KR | 10-2012-0069823 A | 6/2012 |
| KR | 20-2012-0005631 U | 8/2012 |
| KR | 10-2013-0107848 A | 10/2013 |
| KR | 10-1490987 B1 | 2/2015 |
| KR | 10-2016-0009901 A | 1/2016 |
| KR | 10-1586080 B1 | 1/2016 |
| KR | 10-2016-0075131 A | 6/2016 |
| KR | 10-1692444 B1 | 1/2017 |
| WO | WO2016/087469 A1 | 6/2016 |

OTHER PUBLICATIONS

Office Action issued in KR Patent Application No. 10-2017-0062740 dated Dec. 31, 2018.
Office Action dated Feb. 6, 2023 for U.S. Appl. No. 16/613,279.

* cited by examiner

[Figure 1]
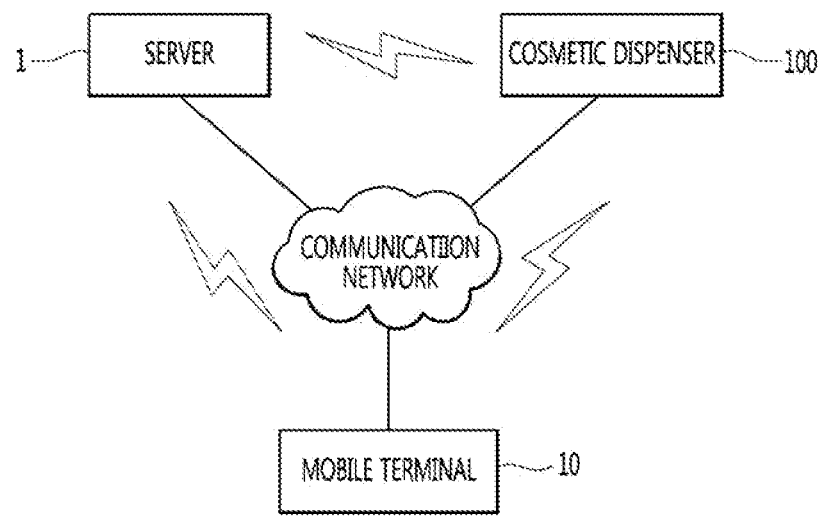

【Figure 2】
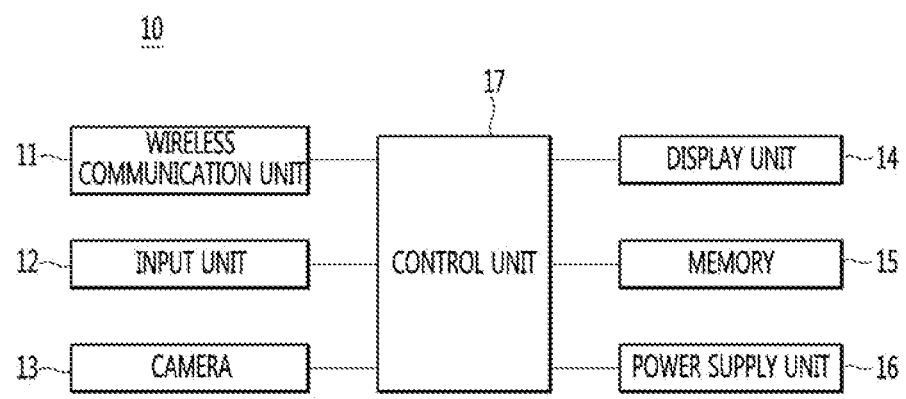

【Figure 3】
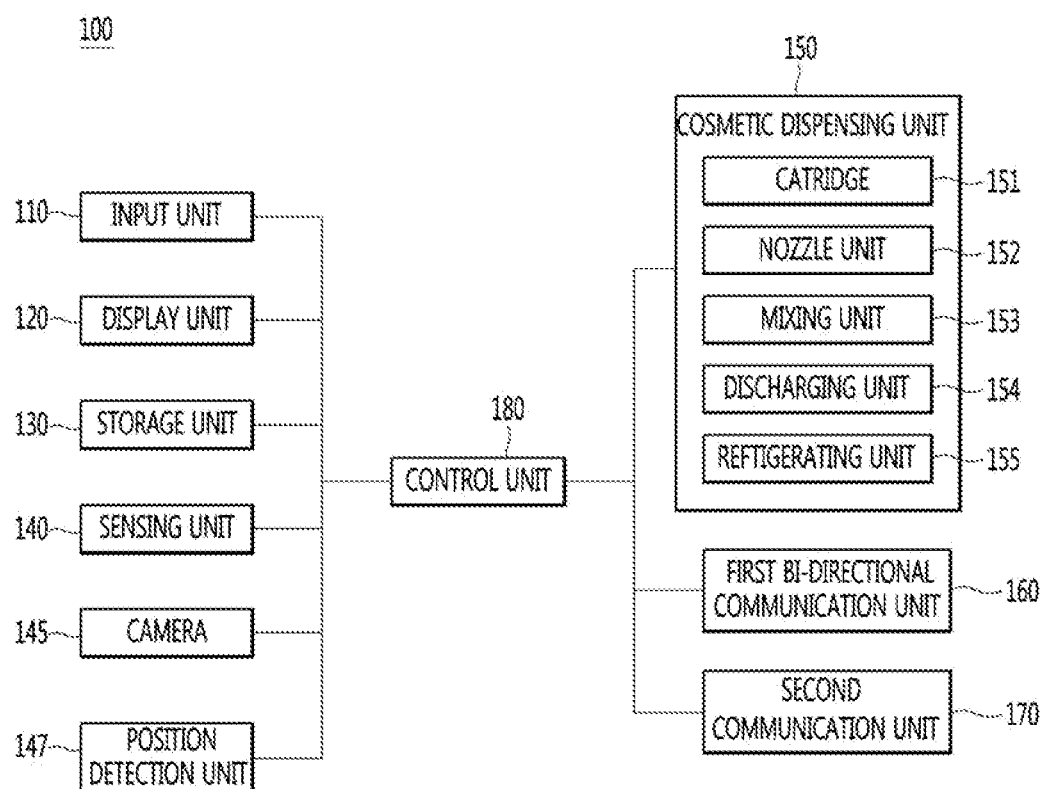

[Figure 4]
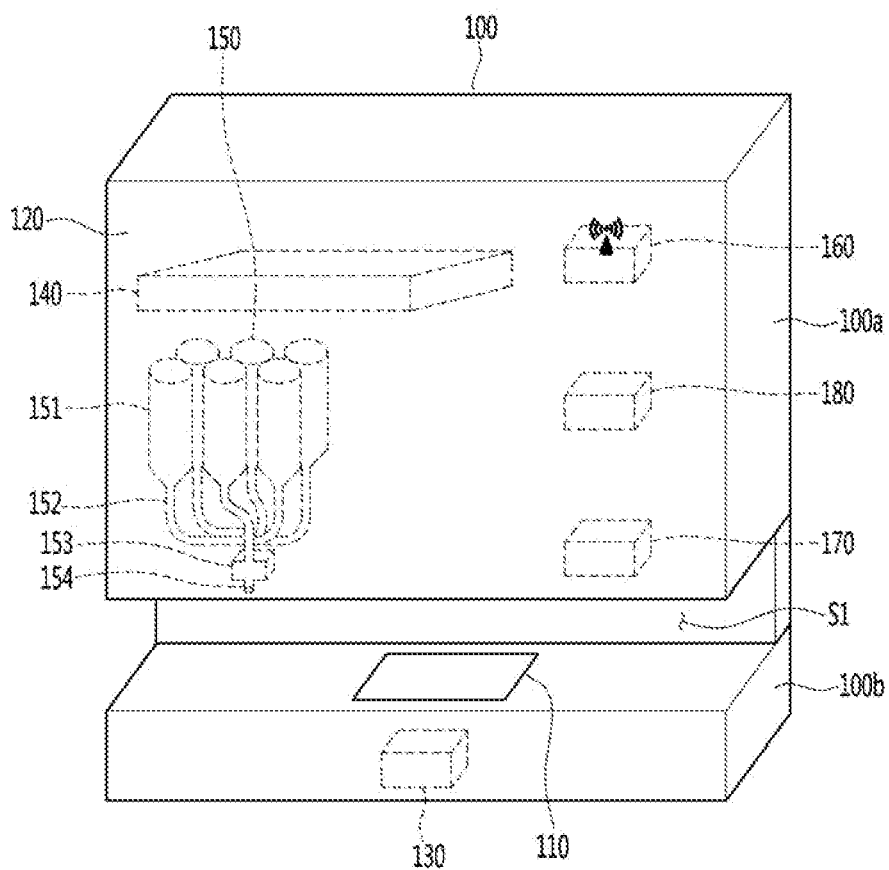

[Figure 5]
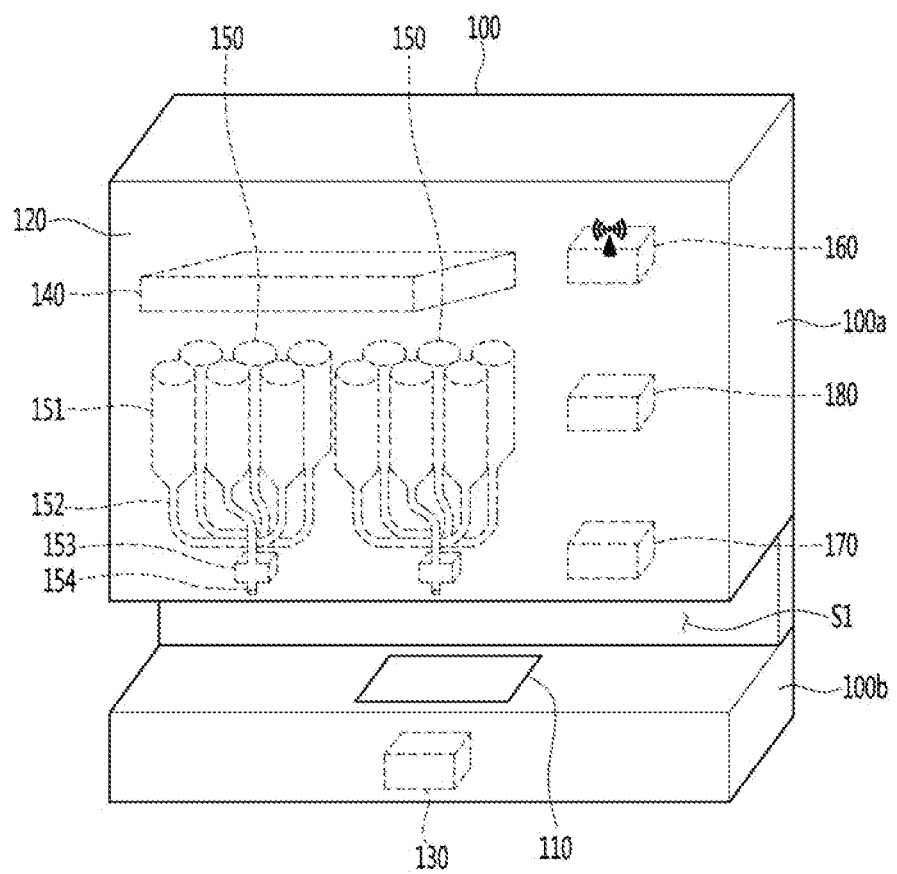

[Figure 6]
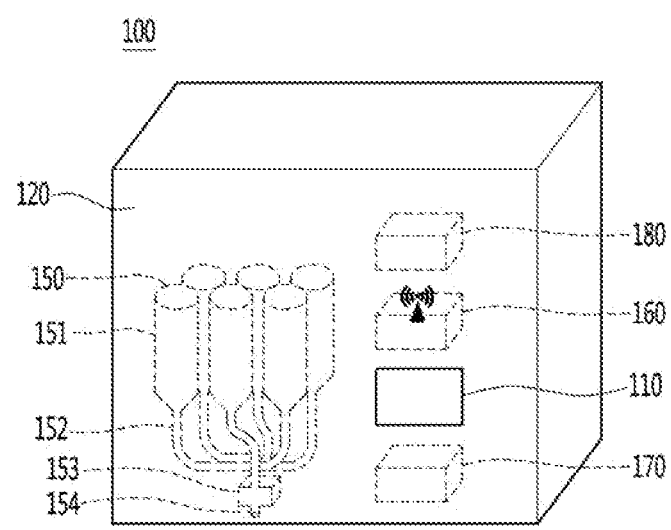

【Figure 7】
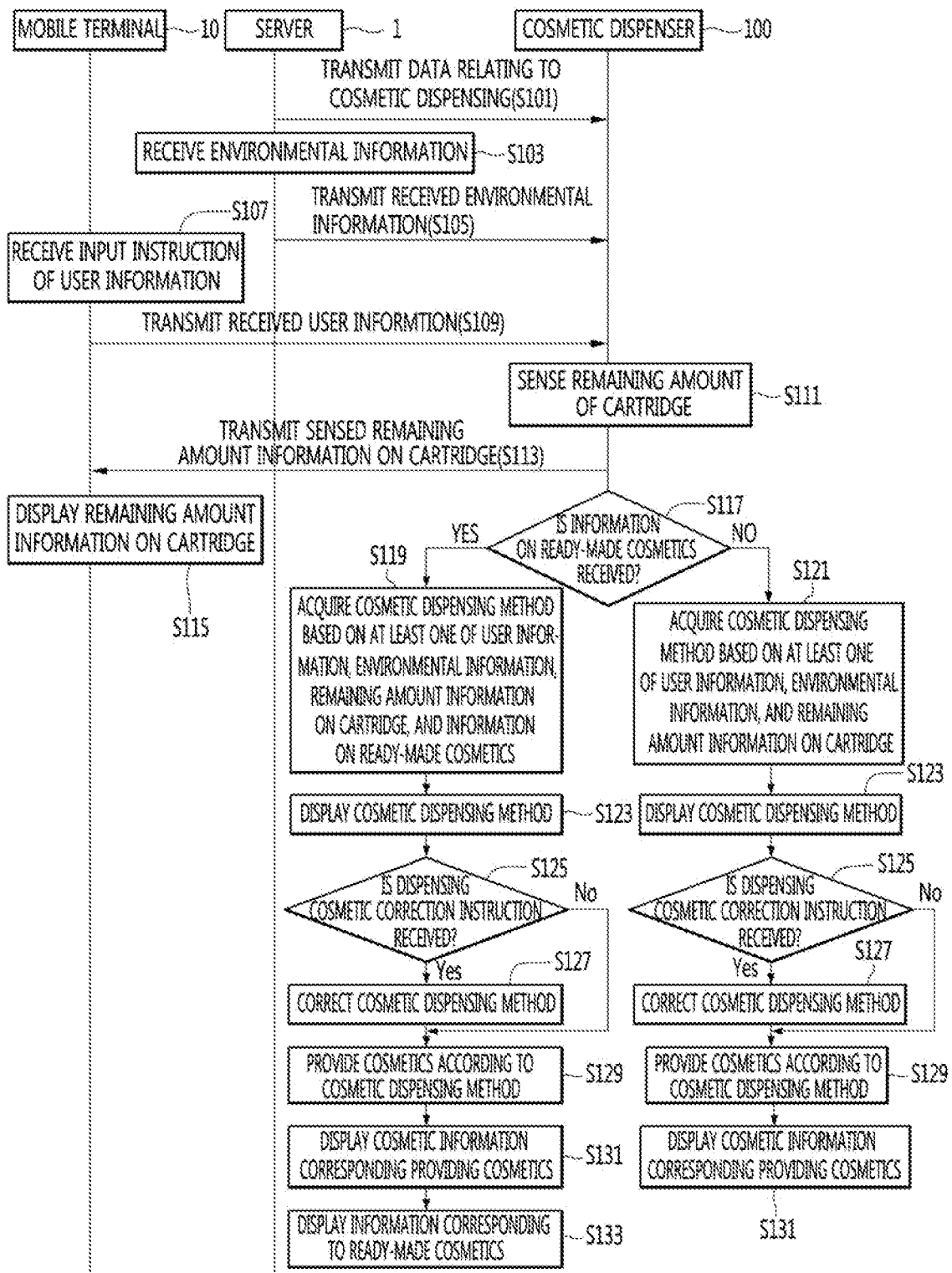

[Figure 8]
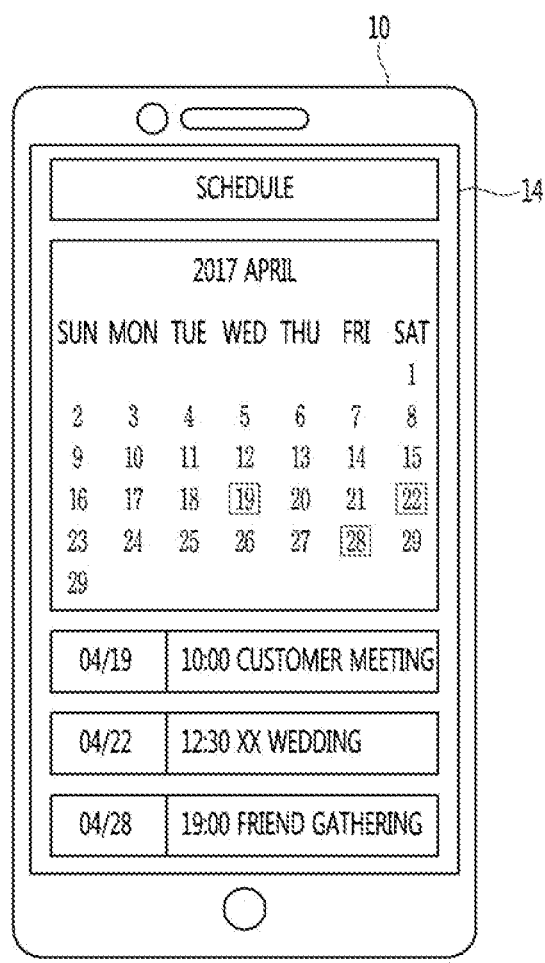

【Figure 9】
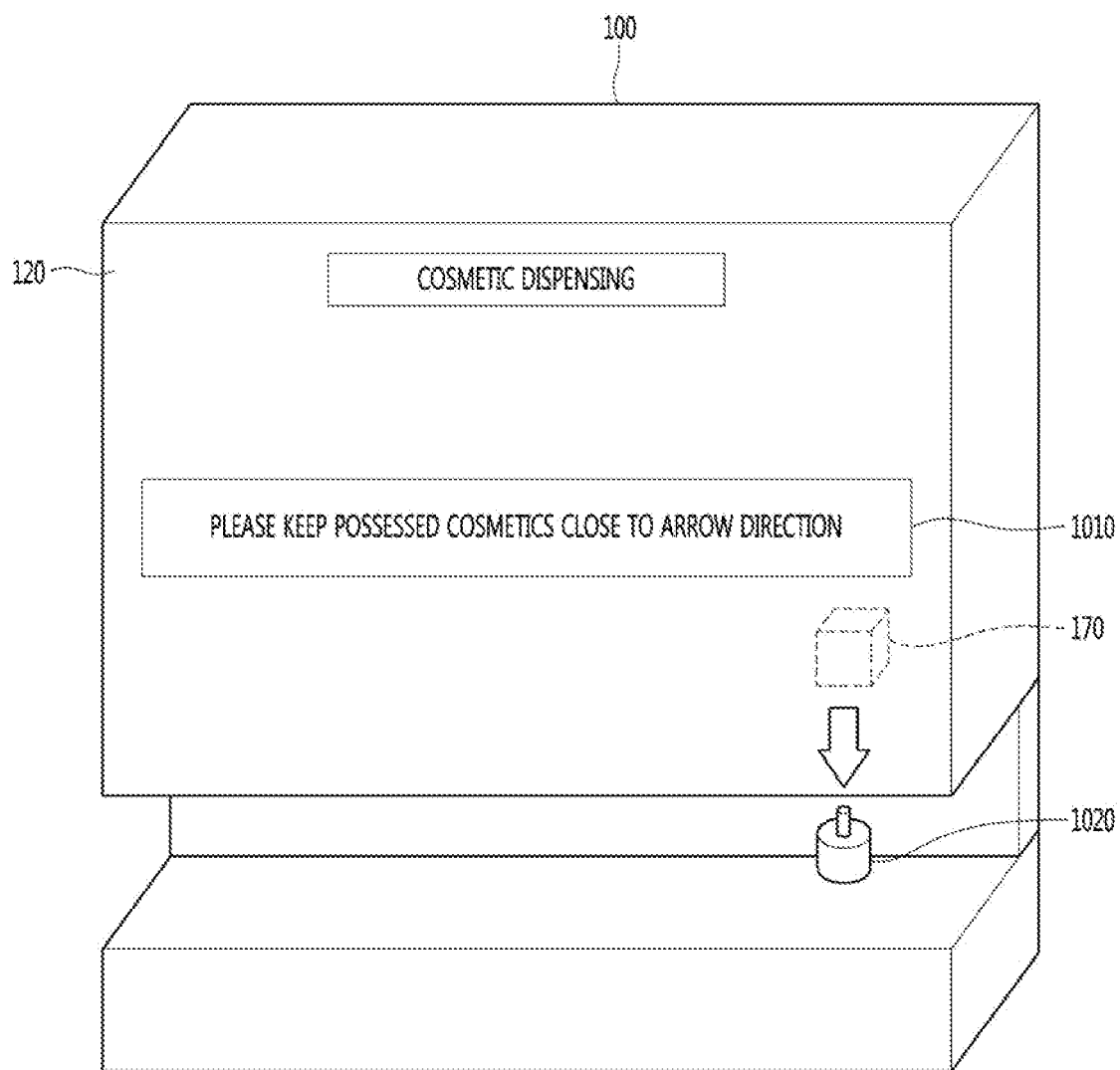

【Figure 10a】
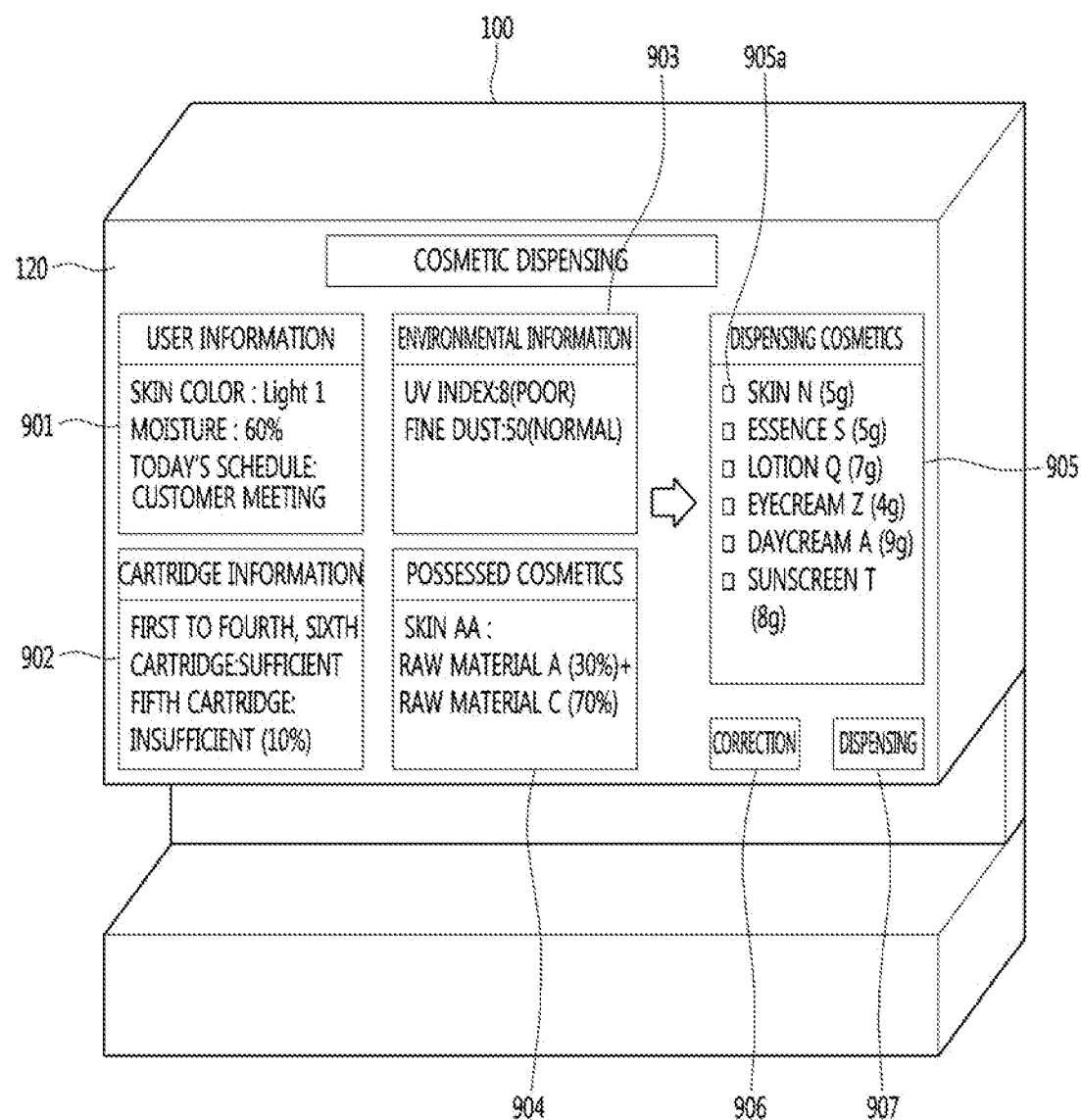

[Figure 10b]
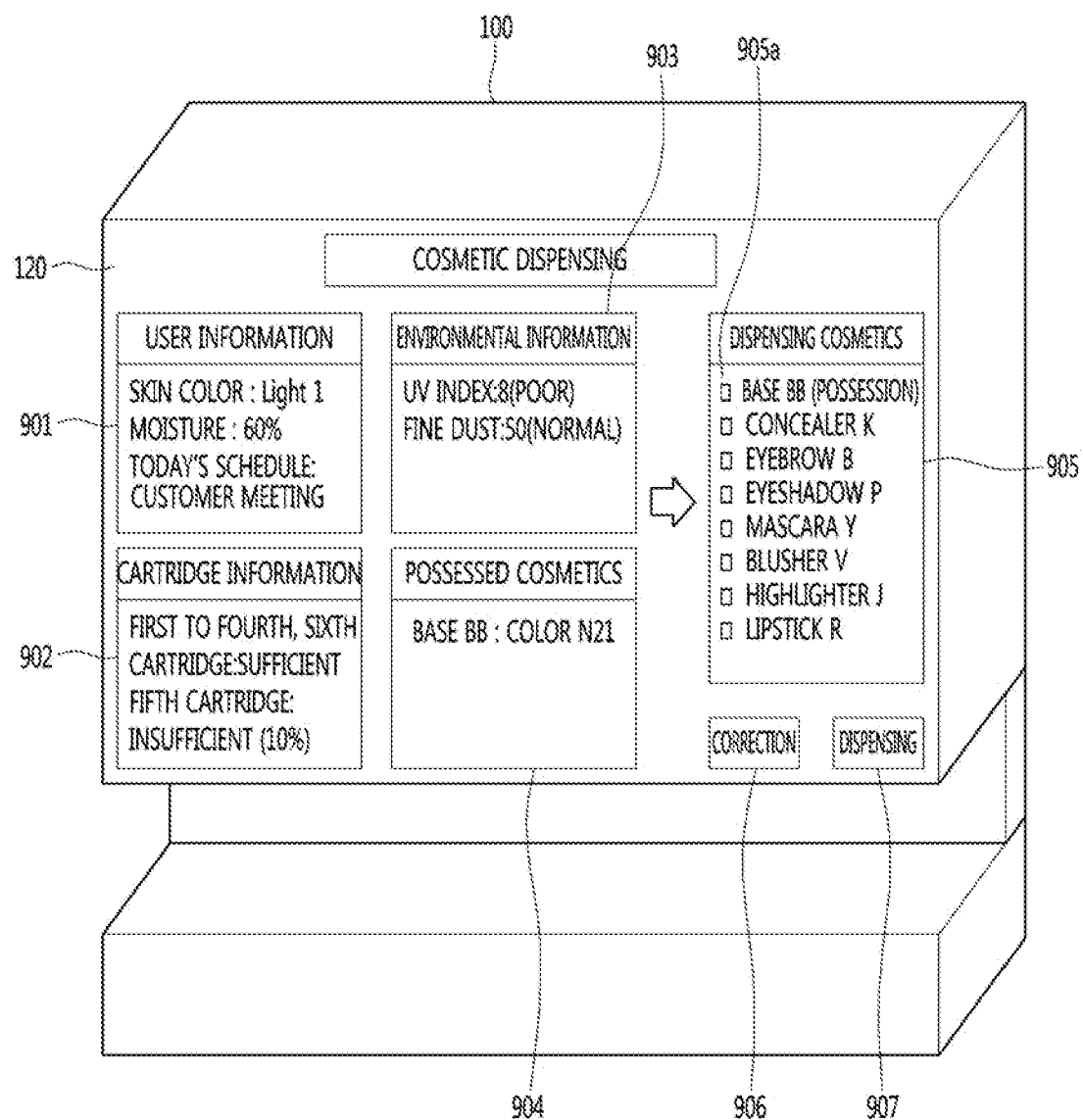

[Figure 10c]
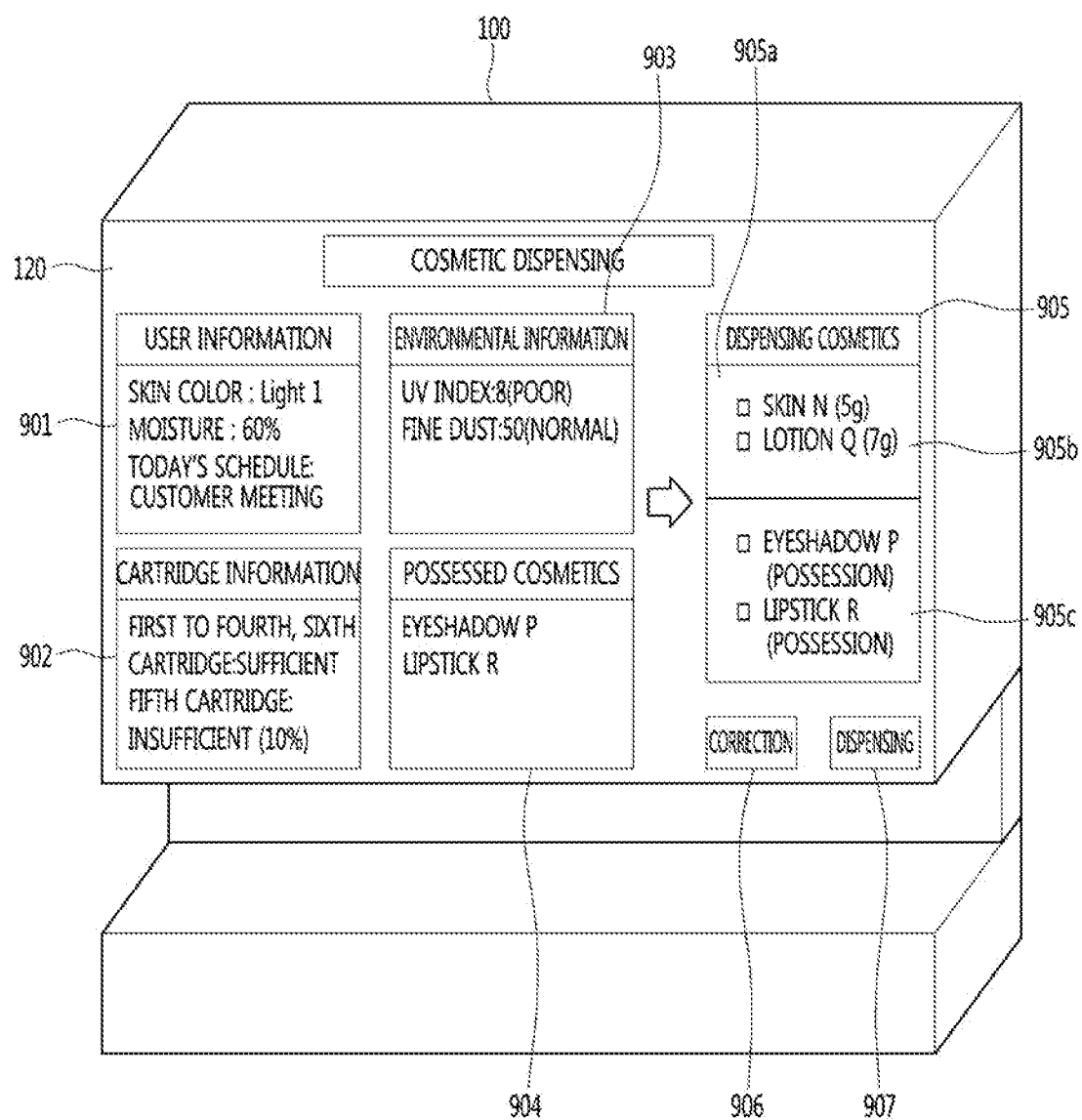

[Figure 10d]
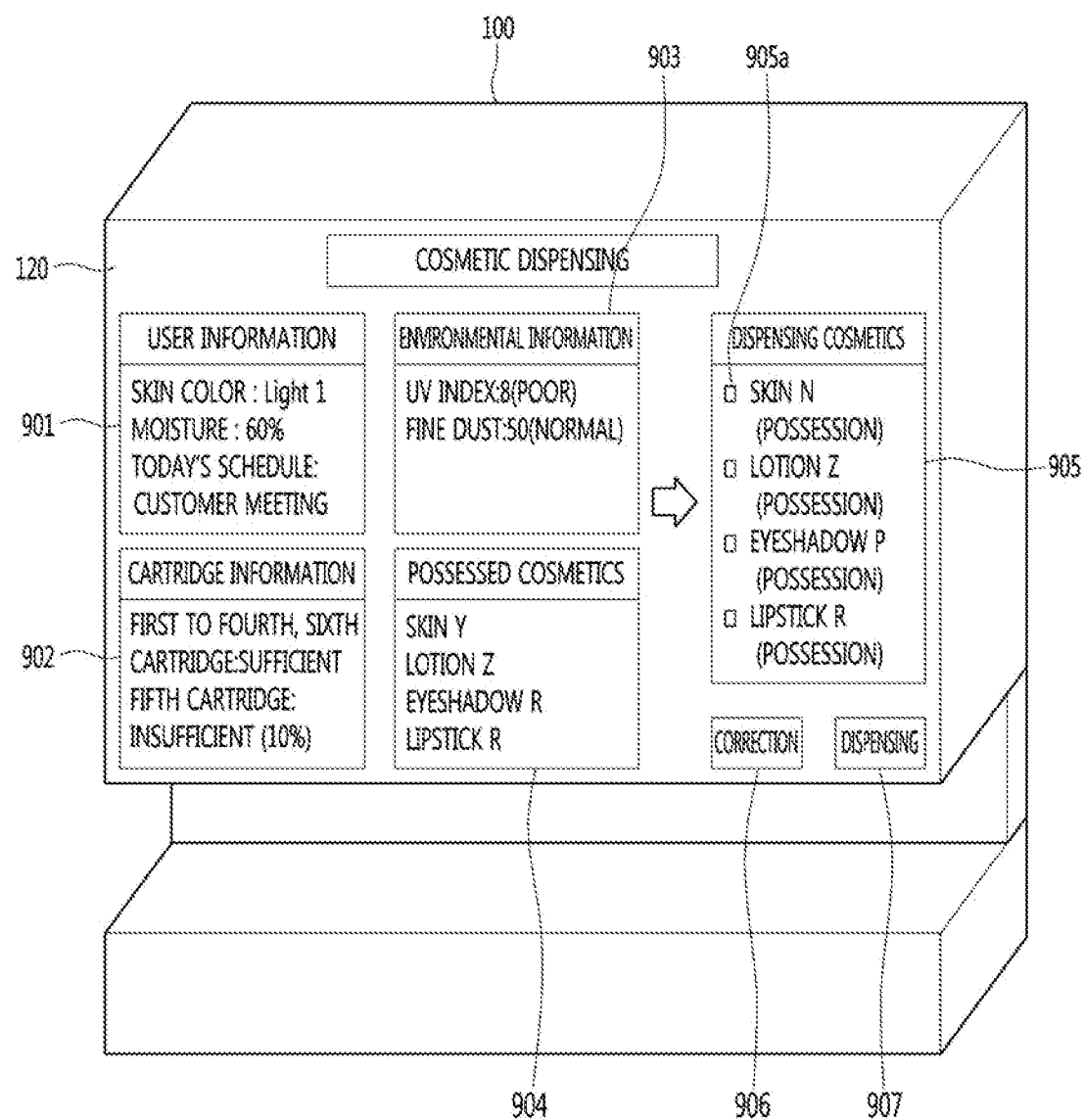

【Figure 11】
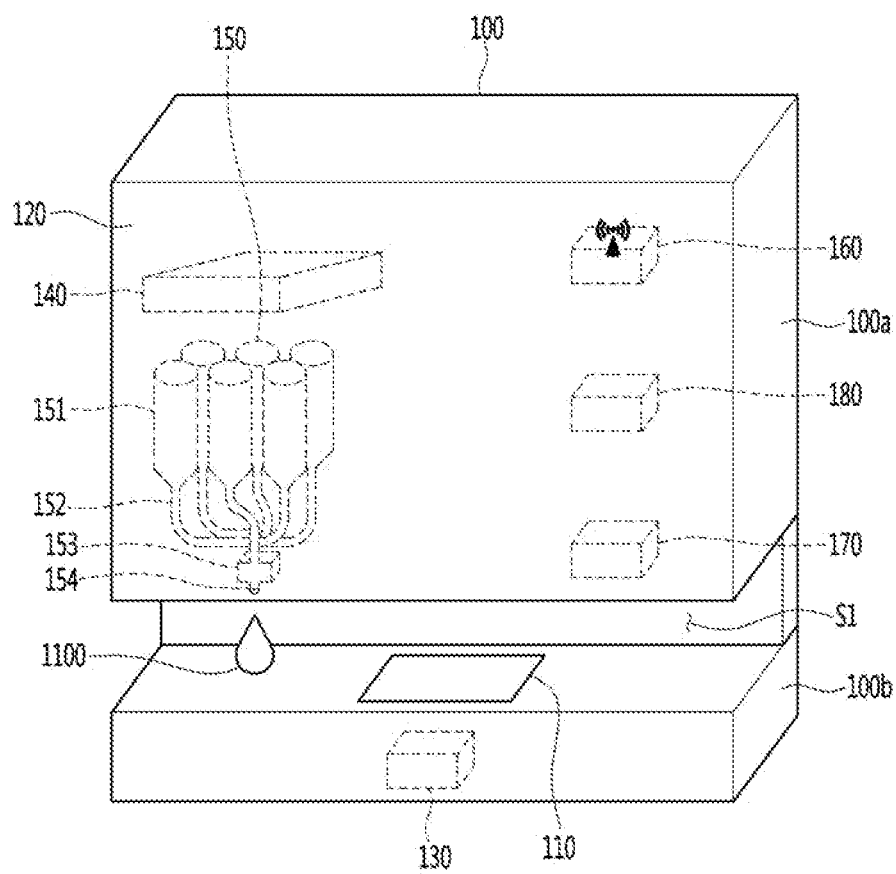

[Figure 12]
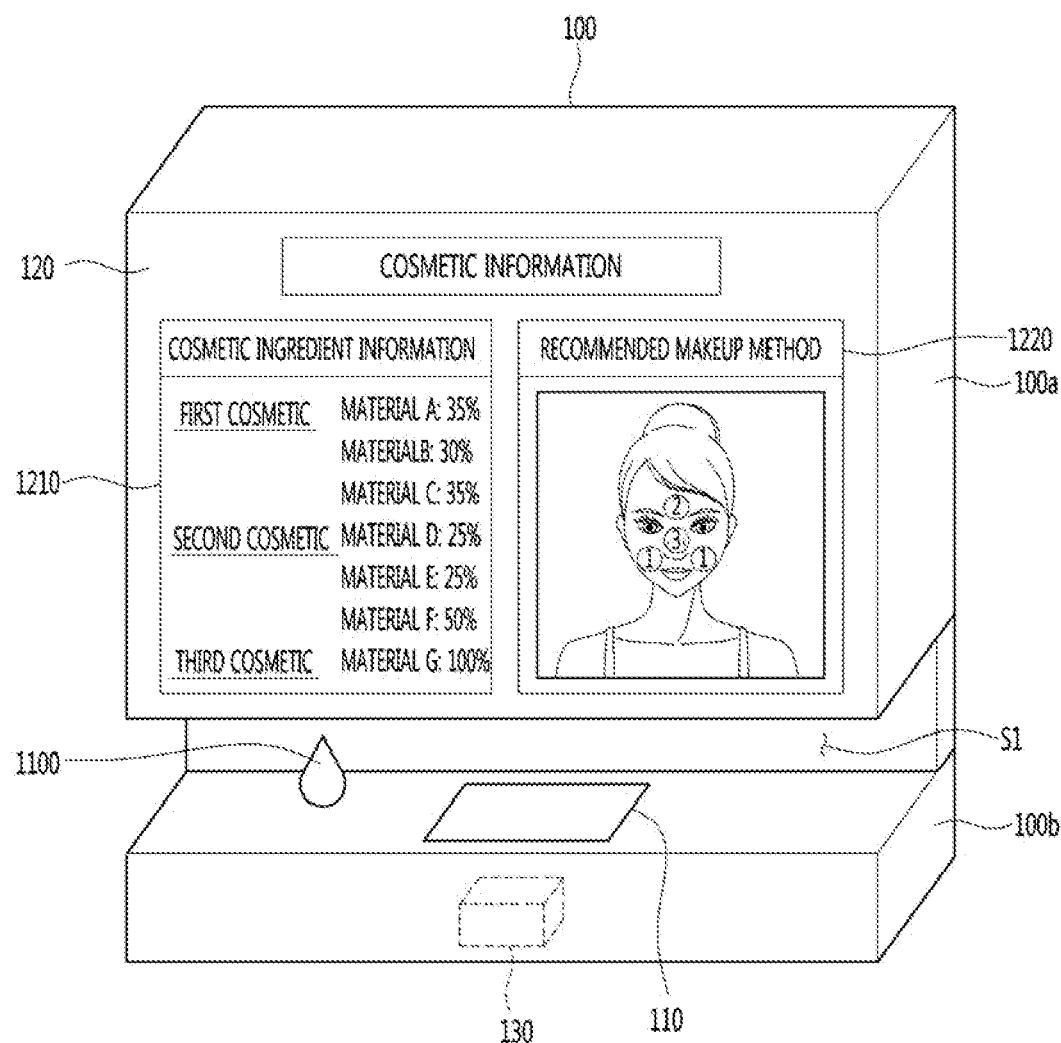

【Figure 13a】
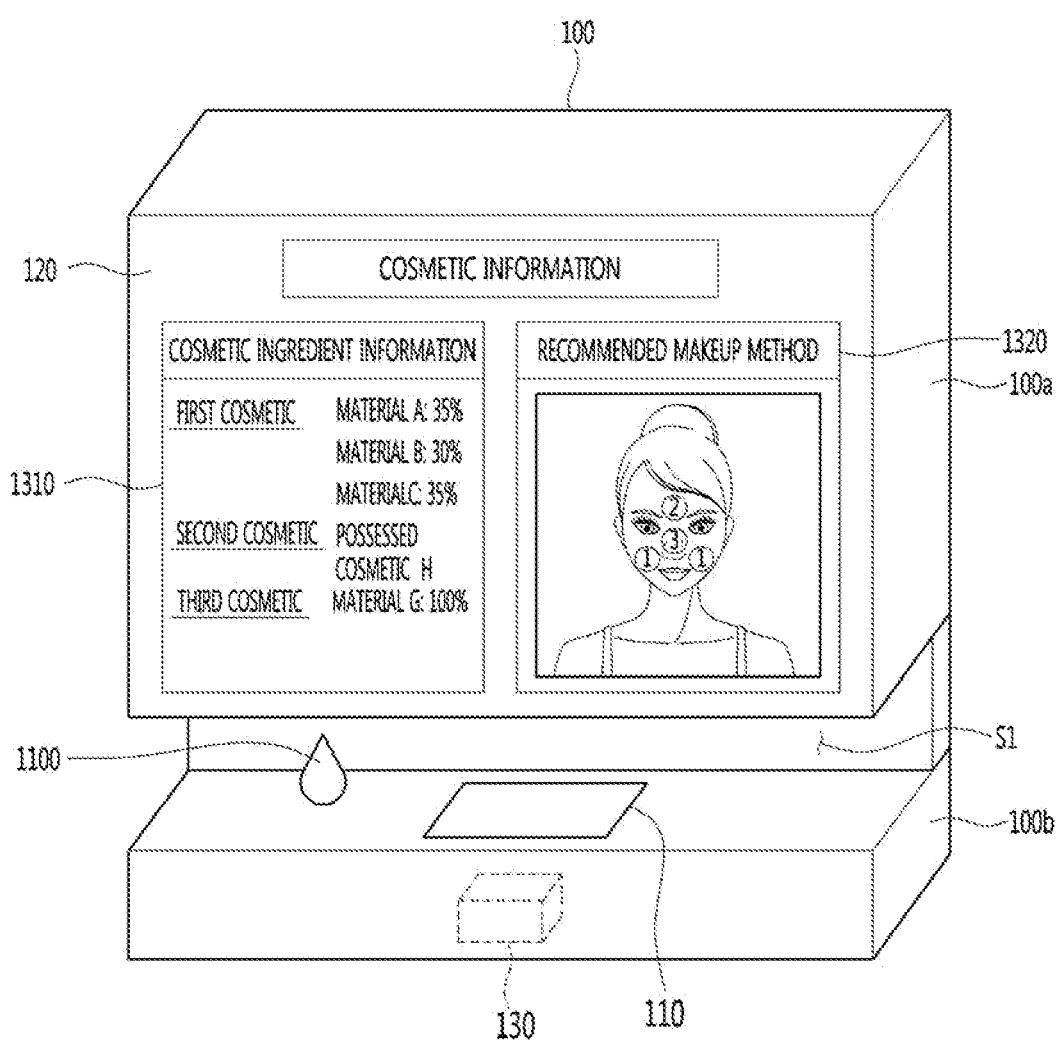

[Figure 13b]
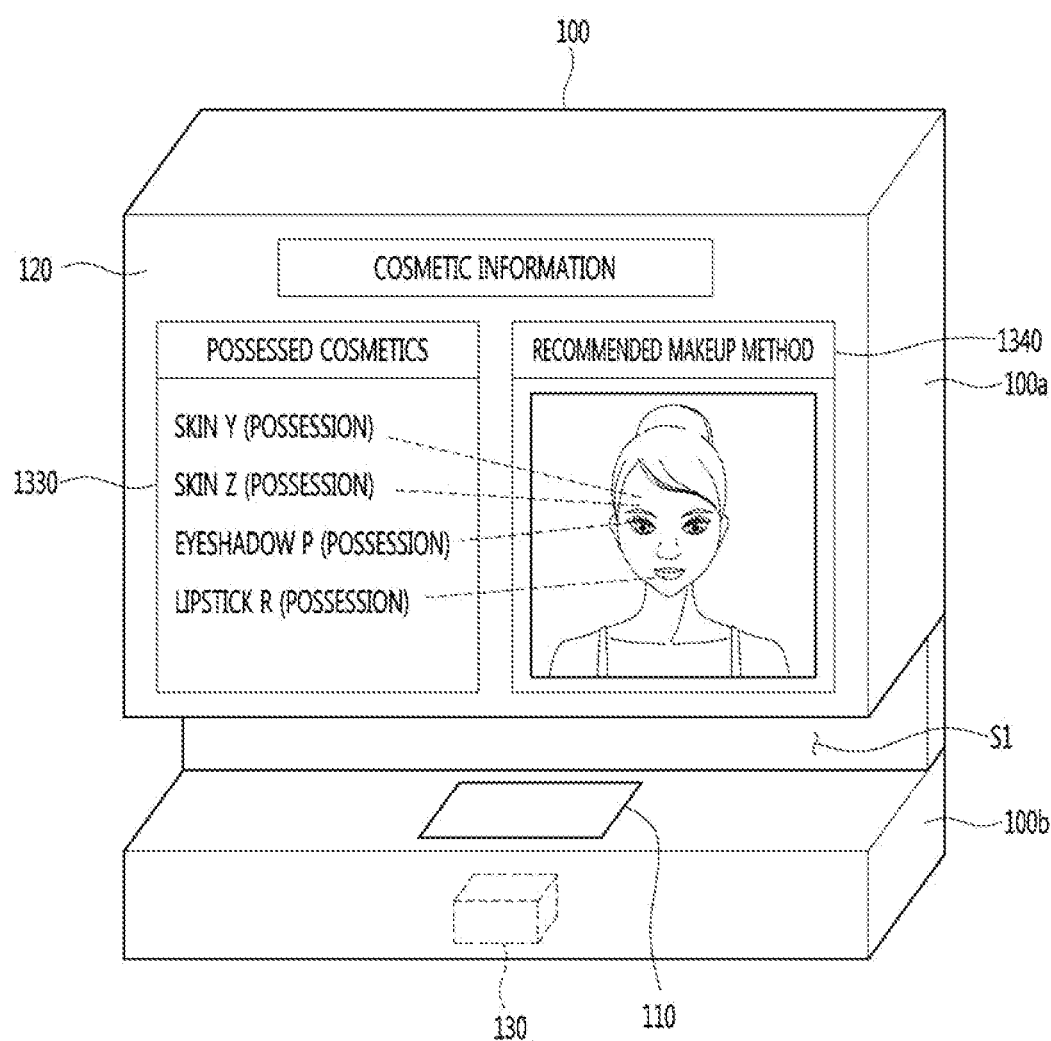

【Figure 13c】
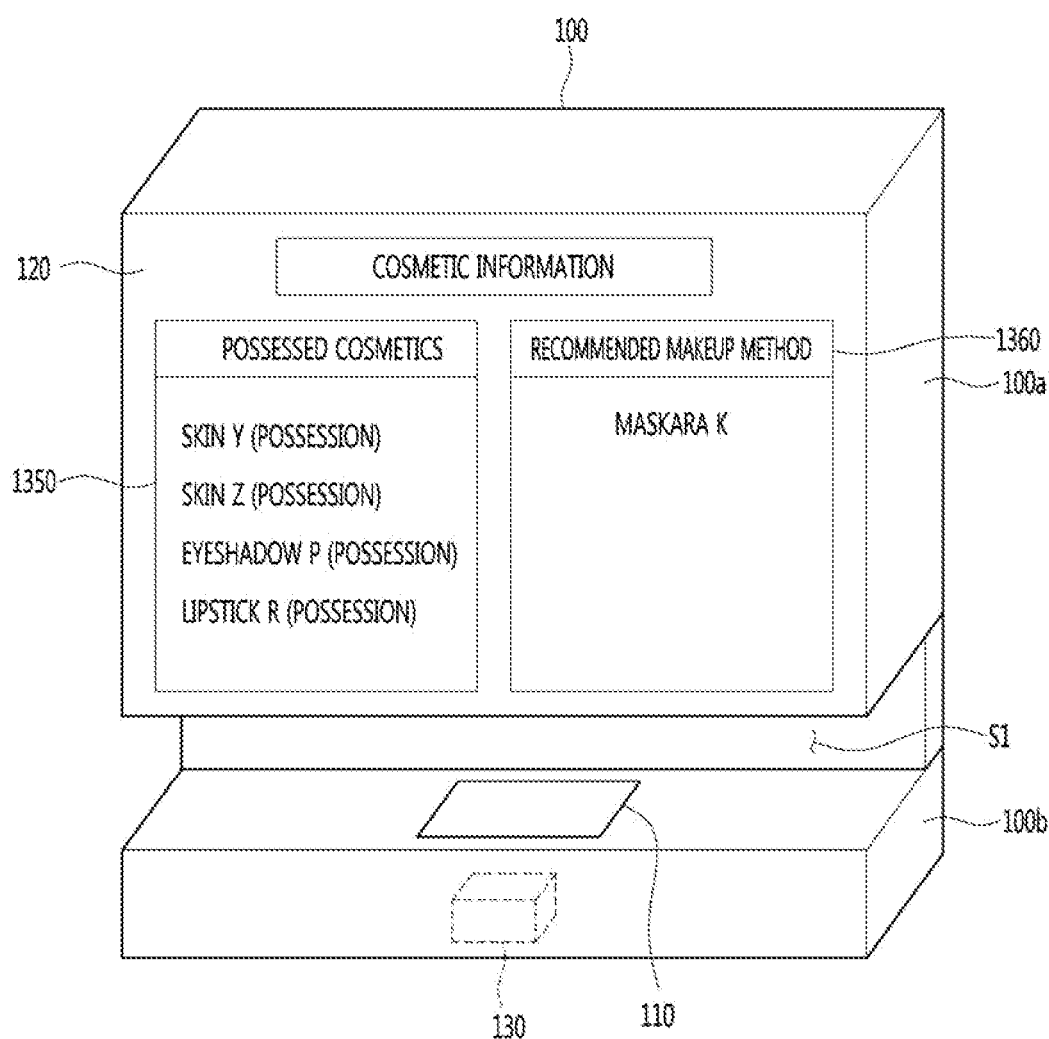

[Figure 14]
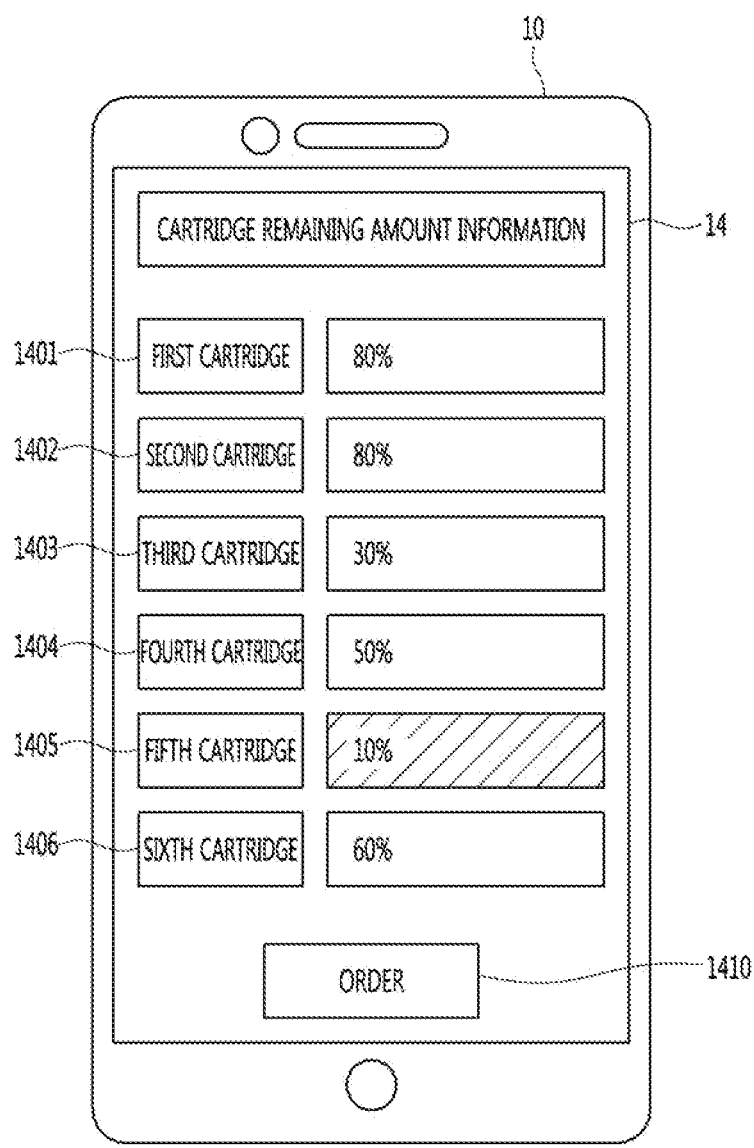

【Figure 15】
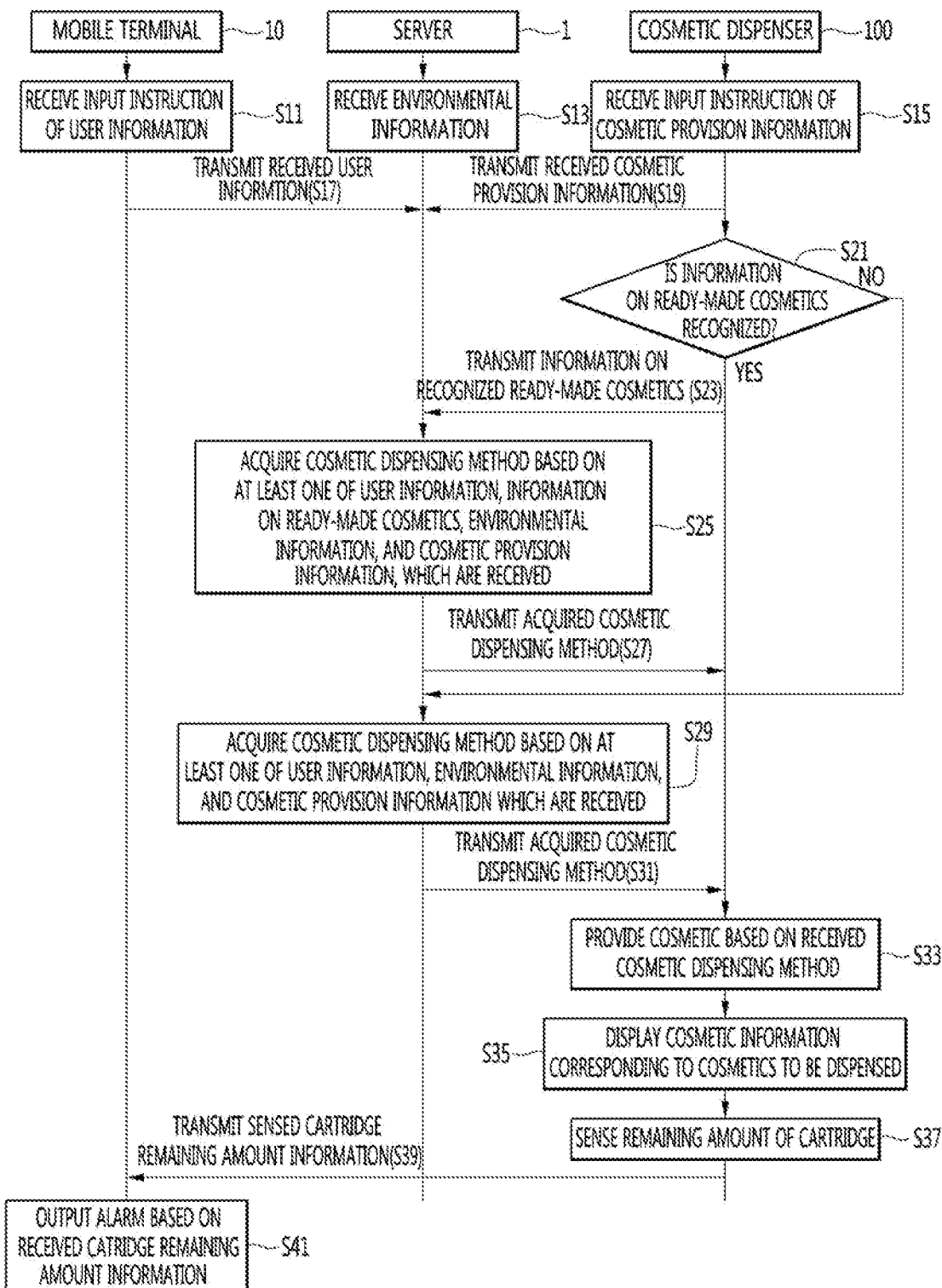

【Figure 16】
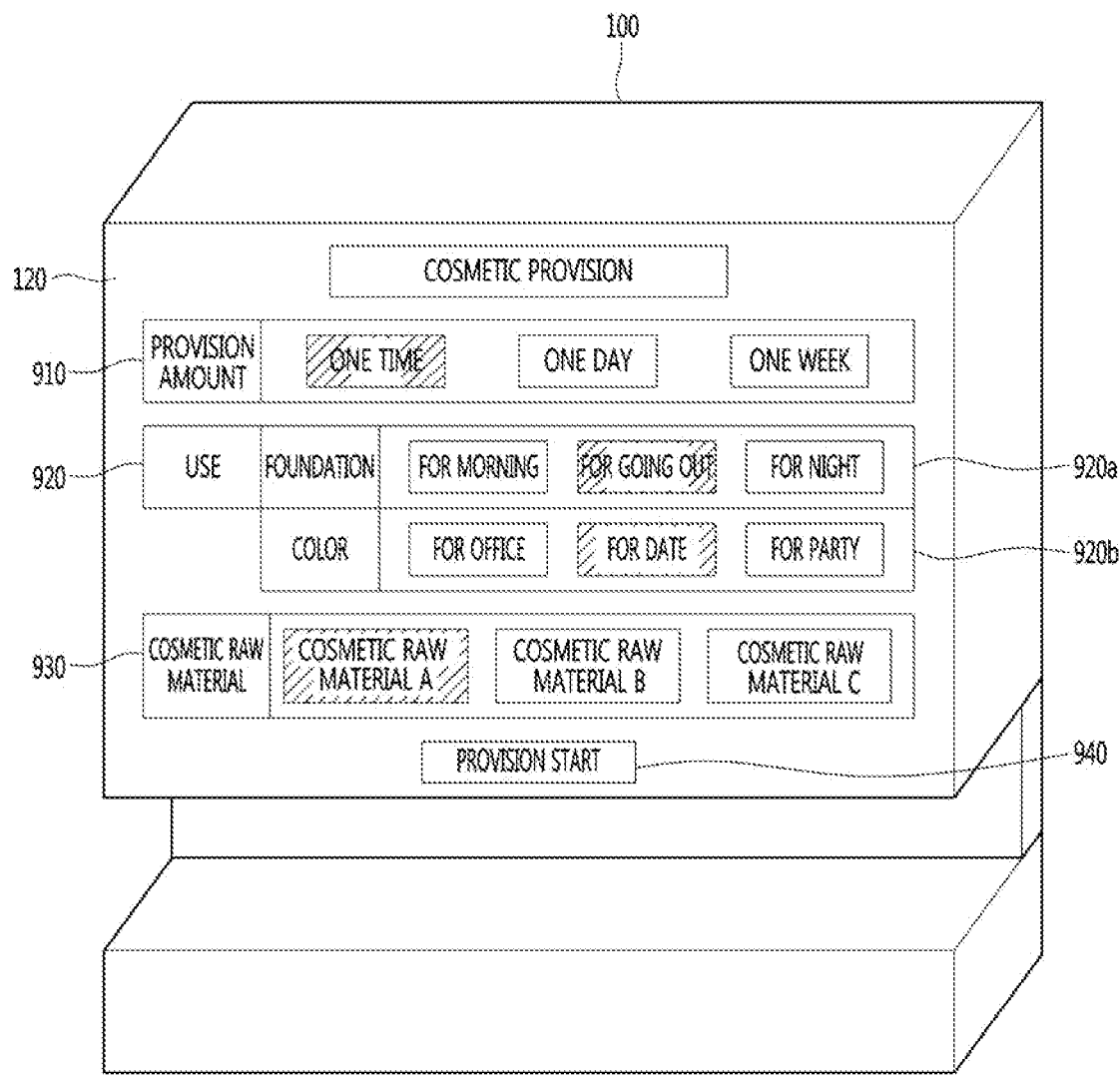

COSMETIC DISPENSER AND METHOD FOR OPERATING SAME

CROSS-REFERENCE TO RELATED APPLICATIONS

This Application is a Divisional of co-pending U.S. patent application Ser. No. 16/613,279 filed on Nov. 13, 2019, which was filed as the National Phase of PCT International Application No. PCT/KR2017/011749 filed on Oct. 24, 2017, which claims the priority benefit under 35 U.S.C. § 119(a) to Korean Patent Application No. 10-2017-0062740 filed in the Republic of Korea on May 22, 2017, all of which are hereby expressly incorporated by reference into the present application.

BACKGROUND OF THE DISCLOSURE

Field of the Invention

The present invention relates to a cosmetic dispenser that wirelessly communicates an external device and a method for operating the same.

Discussion of the Related Art

According to the development of the beauty industry, a user is increasingly interested in beauty products and beauty services such as cosmetics and makeup. According to the increase in interest in such beauty product and such beauty services, a user may find cosmetics that match a skin condition of the user and cosmetics that suit own face of the user.

Specifically, a user may need a cosmetic dispenser, cosmetic dispensing services or the like for recommending cosmetics suitable for a skin condition of the user and a device or services for recommending a makeup product or a makeup method suitable to face of the user when the user images the face of the user.

On the other hand, a user may need a cosmetic recommendation, a cosmetic manufacturing device/cosmetic manufacturing services, or the like by other factors such as daily life as well as appearance-related factors such as a skin condition and a face of the user.

SUMMARY OF THE INVENTION

The present invention has been made to solve the problems described above and an objective thereof is to provide a cosmetic dispenser which provides cosmetics based on schedules of a user, weather and the like and a method for operating the same.

In addition, another objective thereof is to provide a cosmetic dispenser which is linked to mobile terminals thereof and a method for operating the same.

According to an embodiment of the present invention, there is provided a cosmetic dispenser including: a first bi-directional communication unit that receives at least one of user information including a schedule and environmental information including weather from a mobile terminal, a control unit that acquires a cosmetic dispensing method based on at least one of the user information and the environmental information which are received, and a cosmetic dispensing unit that comprises at least one cartridge that contains cosmetics, a nozzle unit that moves the cosmetics contained in the cartridge according to the acquired cosmetic dispensing method, and a discharging unit that discharges the cosmetics passed through the nozzle unit to the outside.

The cosmetic dispenser may further include an input unit that receives an input instruction of cosmetic provision information setting at least one of cosmetic amount, a use of the cosmetics to be dispensed, and cosmetic raw materials to be contained in the cosmetics to be dispensed and the control unit may acquire a cosmetic dispensing method based on at least one of the user information, the environmental information and the cosmetic provision information which are received.

The cosmetic dispenser may further include a second communication unit implemented as a bar code recognizer or a RFID reader that can recognize a ready-made cosmetic information and the control unit may acquire a cosmetic dispensing method based on at least one of the user information, the environmental information, and the ready-made cosmetic information which are received.

The cosmetic dispenser may further include a display unit that displays information on the dispensed cosmetics through the cosmetic dispensing unit.

The display unit may be implemented as a mirror display.

The information on the dispensed cosmetics may include a cosmetic type, the cosmetic raw materials information, and how to use the dispensed cosmetics.

The cosmetic dispensing method may include a cosmetic type to be dispensed, a cosmetic amount to be dispensed, and a cosmetic dispensing order.

The cosmetic dispenser may further include a sensing unit that senses a remaining amount of at least one the cartridge and the first bi-directional communication unit may transmit information on the sensed remaining amount of the cartridge to the mobile terminal.

The cosmetic dispenser may be implemented as a stationary cosmetic dispenser or a portable cosmetic dispenser.

The user information may include schedule information input to the mobile terminal, and the environmental information may include weather information received to the mobile terminal.

In addition, there is provided a method for operating a cosmetic dispenser, the method including: receiving user information from a mobile terminal, acquiring a cosmetic dispensing method based on the received user information, and dispensing cosmetics according to the acquired cosmetic dispensing method.

The method further includes receiving environmental information, and the acquiring the cosmetic dispensing method may include acquiring the cosmetic dispensing method based on at least one of the user information and the environmental information.

The method further includes receiving input instruction of cosmetic provision information that sets at least one of a cosmetic amount, a use of the cosmetics to be dispensed, and cosmetic raw materials to be contained in the cosmetics to be dispensed and the acquiring the cosmetic dispensing method may include acquiring the cosmetic dispensing method based on at least one of the user information and the cosmetic provision information.

The method may further include recognizing information on a ready-made cosmetics having a bar code or a RFID tag and the acquiring the cosmetic dispensing method may include acquiring the cosmetic dispensing method based on at least one of the user information and the information on the ready-made cosmetics.

The method may include sensing the remaining amount of the cartridge mounted on the cosmetic dispenser and transmitting information on the sensed remaining amount of the cartridge to the mobile terminal.

The method may further include displaying information on the dispensed cosmetics and the information on the dispensed cosmetics may include the cosmetic type, the cosmetic raw material information, and how to use the dispensed cosmetics.

In addition, there is provided a cosmetic dispensing system including: a mobile terminal that receives an input instruction for user information including a schedule and transmitting the user information to a server; a server that acquires a cosmetic dispensing method based on the received user information and transmits the acquired cosmetic dispensing method to the outside, and a cosmetic dispenser that receives the cosmetic dispensing method from the server and dispenses cosmetics based on the received cosmetic dispensing method.

The server may further receive at least one of environmental information including weather and cosmetic provision information, and acquire a cosmetic dispensing method based on at least one of the user information, the environmental information, and the cosmetic provision information.

The user information may include at least one of a skin condition of a user, a face image, and alarm setting information, and the environmental information may include at least one of a current temperature, a humidity, a fine dust concentration and an ultraviolet ray index, and the cosmetic provision information may include a cosmetic amount and a use of the cosmetics to be dispensed, and the cosmetic raw materials selected to be included in cosmetics to be dispensed.

The server may further receive information on the ready-made cosmetics and may acquire the cosmetic dispensing method based on at least one of the user information, the environmental information, the cosmetic provision information, and the information on the ready-made cosmetics.

The cosmetic dispenser includes at least one cartridge that contains cosmetics, a nozzle unit that moves cosmetics contained in the cartridge according to the received cosmetic dispensing method, and a discharging unit that discharges the cosmetics passed through the nozzle unit to the outside.

The cosmetic dispenser may further include a sensing unit that senses a remaining amount of at least one cartridge, and a bi-directional communication unit that transmits the sensed remaining amount information on the cartridge to the mobile terminal.

In addition, there is provided a method for operating a cosmetic dispensing system, the method including: receiving at least one of user information including a schedule, environmental information including weather, and cosmetic provision information, acquiring a cosmetic dispensing method based on at least one of the user information, the environmental information, and the cosmetic provision information received by the server, transmitting the acquired cosmetic dispensing method by the server to the cosmetic dispenser, and dispensing cosmetics based on the received cosmetic dispensing method from the server by the cosmetic dispenser.

According to the embodiment of the present invention, there is an advantage that the necessary cosmetics can be provided based on the schedule of the user or the weather.

According to the embodiment of the present invention, there is an advantage that new cosmetics can be provided to the user every day through the cosmetic dispenser.

According to the embodiment of the present invention, there is an advantage that cosmetics suitable for various situations can be provided immediately through the portable cosmetic dispenser when the user goes out.

According to the embodiment of the present invention, there is an advantage to provide cosmetics necessary for the user and to suggest a use plan of the cosmetics possessed by the user.

According to the embodiment of the present invention, there is an advantage that the remaining amount information on the cosmetic dispenser is transmitted to the mobile terminal so that the user can replace the cartridge before the cosmetics are exhausted therein.

BRIEF DESCRIPTION OF THE DRAWINGS

FIG. 1 is a block diagram illustrating a configuration of a cosmetic dispensing system according to an embodiment of the present invention.

FIG. 2 is a block diagram illustrating the configuration of a mobile terminal according to an embodiment of the present invention.

FIG. 3 is a block diagram illustrating a configuration of a cosmetic dispenser according to an embodiment of the present invention.

FIG. 4 is an exemplary view illustrating a stationary cosmetic dispenser according to a first embodiment of the present invention.

FIG. 5 is an exemplary view illustrating a stationary cosmetic dispenser according to a second embodiment of the present invention.

FIG. 6 is an exemplary view illustrating a portable cosmetic dispenser according to an embodiment of the present invention.

FIG. 7 is a diagram illustrating a method for operating the cosmetic dispensing system according to an embodiment of the present invention.

FIG. 8 is a view explaining an example of user information received by a mobile terminal according to an embodiment of the present invention.

FIG. 9 is a view explaining a method for recognizing information on the ready-made cosmetics by the cosmetic dispenser according to an embodiment of the present invention.

FIG. 10a to FIG. 10d are views explaining a method for acquiring a cosmetic dispensing method by the cosmetic dispenser according to an embodiment of the present invention.

FIG. 11 is a view explaining a state where a cosmetic dispenser according to an embodiment of the present invention dispenses cosmetics manufactured according to the cosmetic dispensing method.

FIG. 12 is an exemplary view explaining a method for displaying information on cosmetics dispensed by the cosmetic dispenser according to an embodiment of the present invention.

FIG. 13a is a view explaining a method for displaying the ready-made cosmetic information according to a first embodiment of the present invention.

FIG. 13b is a view explaining a method for displaying the ready-made cosmetic information according to a second embodiment of the present invention.

FIG. 13c is a view explaining a method for displaying the ready-made cosmetic information according to a third embodiment of the present invention.

FIG. 14 is an exemplary view explaining a method for outputting cartridge remaining amount information by a mobile terminal according to an embodiment of the present invention.

FIG. 15 is a diagram explaining a method for operating a cosmetic dispensing system according to another embodiment of the present invention.

FIG. 16 is a view explaining a method for receiving an input instruction of cosmetic provision information by the cosmetic dispenser according to an embodiment of the present invention.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, a cosmetic dispenser linked with an external device and a method for operating the same according to an embodiment of the present invention will be described.

First, FIG. 1 is a block diagram illustrating a configuration of a cosmetic dispensing system according to an embodiment of the present invention.

Referring to FIG. 1, the cosmetic dispensing system according to an embodiment of the present invention may include a server 1, a mobile terminal 10, and a cosmetic dispenser 100.

The server 1, the mobile terminal 10, and the cosmetic dispenser 100 can transmit and receive signals to and from each other through a communication network.

The communication network may mean a set of resources constituting a communication path between the server 1, the mobile terminal 10, and the cosmetic dispenser 100. The server 1, the mobile terminal 10, and the cosmetic dispenser 100 can transmit and receive signals to and from each other through any one of a mobile communication technology, a wireless Internet technology, a local area communication technology, and the like.

Examples of the mobile communication technology include Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE) Long Term Evolution-Advanced (LTE-A), and the like and the mobile communication technology is a technology that transmits and receives wireless signals through a mobile communication network constructed according to any one of technologies listed above.

Examples of wireless Internet technology include Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), and the like, and the wireless Internet technology is a technology that transmits and receives wireless signals according to at least one of the wireless Internet technologies listed above.

Examples of the local area communication technology include Bluetooth™, Radio Frequency Identification (RFID), Infrared Data Association (IrDA), Ultra Wideband (UWB), ZigBee, Near Field Communication (NFC) Fidelity), Wireless-Fidelity (Wi-Fi), Wi-Fi Direct, Wireless Universal Serial Bus (Wireless USB), and the like, the local area communication technologies listed above have different limited distances from each other which can transmit and receive wireless signals, and the local area communication technology is a technology that transmits and receives wireless signals using at least one of the local area communication technologies listed above.

The server 1, the mobile terminal 10, and the cosmetic dispenser 100 can transmit and receive signals to each other using at least one or combining at least two of the mobile communication technology, the wireless Internet technology, and the local area communication technology, which are listed above.

In addition, the techniques listed above are merely illustrative and the server 1, the mobile terminal 10, and the cosmetic dispenser 100 may use other radio signal transmission and reception techniques.

Next, the server 1, the mobile terminal 10, and the cosmetic dispenser 100 will be described in detail, respectively.

The server 1 may store cosmetic-related data. In particular, the server 1 may store data related to the cosmetic dispensing to provide customized cosmetics to the user.

The cosmetic-related data may include a cosmetic dispensing method and may include all the cosmetic dispensing methods that vary according to user information/environmental information/cosmetic provision information/ready-made cosmetic information, or the like.

User information/environmental information/cosmetic provision information/ready-made cosmetic information will be described below.

Although the cosmetic dispensing method may include a cosmetic type to be dispensed, a cosmetic amount to be dispensed, and a cosmetic dispensing order, this is merely illustrative.

The cosmetics referred in the present invention may include all finished products, semi-finished products, and cosmetic raw materials constituting the product. Therefore, the cosmetic dispensing method may include a mixing ratio of mixing a plurality of cosmetic raw materials and includes all cosmetic dispensing methods that can be manufactured using a plurality of cosmetics.

According to one embodiment, the server 1 transmits cosmetic-related data to the cosmetic dispenser 100 and the cosmetic dispenser 100 can dispense cosmetics based on the cosmetic-related data received from the server 1.

According to another embodiment, the server 1 may receive information related to the cosmetic dispensing from the outside such as the mobile terminal 10 and the cosmetic dispenser 100 and may acquire the cosmetic dispensing method based on received information related to the cosmetic dispensing.

The mobile terminal 10 may transmit information related to cosmetic dispensing to the server 1. Specifically, the mobile terminal 10 can receive the user information by inputting and transmit the user information to the server 1, and the server 1 may acquire the cosmetic dispensing method based on the user information received from the mobile terminal 10.

Here, the user information may include a skin condition, a face image, a schedule, stored alarm information thereof, and the like.

In addition, the mobile terminal 10 may receive environmental information and transmit the received environmental information to the server 1. The server 1 may receive the environmental information from the mobile terminal 10 or another external device and may acquire the cosmetic dispensing method based on the received environmental information.

Here, the environmental information may include current temperature, humidity, fine dust concentration, ultraviolet ray index, and the like.

The mobile terminal 10 may transmit and receive signals to and from the cosmetic dispenser 100. For example, specifically, the mobile terminal 10 may transmit cosmetic dispensing request signal or the like to the cosmetic dispenser 100. The mobile terminal 10 can receive cartridge remaining amount information and the like from the cosmetic dispenser 100. However, this is merely illustrative and the mobile terminal 10 and the cosmetic dispenser 100 may transmit and receive various items of information necessary for dispensing cosmetics.

Each configuration and detailed description of the mobile terminal 10 will be described below with reference to FIG. 2.

The cosmetic dispenser 100 may dispense cosmetics based on the cosmetic dispensing method. According to one embodiment, the cosmetic dispenser 100 may acquire the cosmetic dispensing method through an installed application and may dispense the cosmetics. According to another embodiment, the cosmetic dispenser 100 may receive the cosmetic dispensing method from the server 1 may dispense the cosmetics based on the received cosmetic dispensing method. However, this is illustrative and the cosmetic dispenser 100 may receive the cosmetic dispensing method from the mobile terminal 10.

The cosmetic dispenser 100 may receive an input instruction of cosmetic provision information. The cosmetic provision information may include cosmetic dispensing amount, use of the cosmetics, cosmetic raw materials to be used by the user, and the like.

The cosmetic dispenser 100 may recognize the information on the ready-made cosmetics and may transmit the recognized ready-made cosmetic information to the outside.

The cosmetic dispenser 100 may sense a remaining amount of the cartridge and transmit information on the sensed remaining amount of cartridge to the outside.

Each configuration and detailed description of the cosmetic dispenser 100 will be described below with reference to FIG. 3.

As described above, the server 1, the mobile terminal 10, and the cosmetic dispenser 100 can transmit and receive cosmetic-related data to and from each other and the cosmetic dispenser 100 can manufacture cosmetics based thereon.

Next, a configuration and a role of the mobile terminal 10 according to an embodiment of the present invention will be described specifically with reference to FIG. 2.

FIG. 2 is a block diagram illustrating a configuration of a mobile terminal according to an embodiment of the present invention.

The mobile terminal 10 may include a wireless communication unit 11, an input unit 12, a camera 13, a display unit 14, a memory 15, a power supply unit 16, and a control unit 17. The components described above are merely illustrative for description of the mobile terminal according to the embodiment of the present invention and the mobile terminal 10 may have more or fewer components than the components described above.

Hereinafter, each component of the mobile terminal 10 will be described more specifically.

The wireless communication unit 11 may include at least one modules for enabling wireless communication between the mobile terminal 10 and another mobile terminal, between the mobile terminal 100 and an external server, between the mobile terminal 100 and an external device, or the like. Specifically, the wireless communication unit 11 may include at least one of a mobile communication module, a wireless Internet module, and a local area communication module, which are the same as described above. The wireless communication unit 11 may further include at least one of a broadcast reception module and a location information module in addition to the modules listed above.

The wireless communication unit 11 can transmit and receive signals to and from at least one of the other mobile terminals, the server 1, and the cosmetic dispenser 100. Here, the server 1 may be a server for storing cosmetic-related data and the cosmetic dispenser 100 may be a device that can dispense cosmetics according to a cosmetic dispensing instruction.

The wireless communication unit 11 may transmit the user information, the cosmetic dispensing instruction or the like to the server 1 or the cosmetic dispenser 100 and the wireless communication unit 11 may receive the cartridge remaining amount information from the cosmetic dispenser 100.

The transmission and reception information described above is merely illustrative and the wireless communication unit 11 can transmit and receive all information related to cosmetic dispensing to and from an external device.

The input unit 12 may receive a data input signal or an input instruction. For example, the input unit 12 may receive various data input signals associated with the cosmetic dispensing.

The input unit 12 may receive data through an image input unit for receiving an image signal, an audio input unit for receiving a voice signal, a mechanical key input device, a touch key input device, or the like. The data input signal or the input instruction received through the input unit 12 may be processed as a control instruction and transferred to other components such as the wireless communication unit 11, the display unit 14, the memory 15, the control unit 17, or the like.

The camera 13 may receive an image signal input. The image signal includes still images such as photographs, videos, and the like. Accordingly, the camera 13 can receive an image signal input by imaging a picture, a video, or the like. For example, the camera 13 can image a face image of the user.

The display unit 14 displays (outputs) information processed by the mobile terminal 10. For example, the display unit 14 may display contents to be provided to the user or contents input through the input unit 12 on a screen. The display unit 14 may display screen information on an application program running on the mobile terminal 10.

The display unit 14 can display images being shot or taken through the camera 13. The display unit 14 may display user information such as the skin condition of the user, environmental information such as the current ultraviolet ray index, information related to the cosmetic dispenser such as the remaining amount of the cartridge, or the like.

The display unit 14 may have a mutual layer structure with the touch sensor or may be integrally formed with the touch sensor to realize a touch screen. The touch screen may function as the input unit 12 and provide an output interface between the mobile terminal 10 and the user, at the same time.

The memory 15 stores data supporting various functions of the mobile terminal 10. The memory 15 may store a plurality of application programs or applications running on the mobile terminal 10, data for operation of the mobile terminal 10, and instructions. At least some of these application programs may be downloaded from an external server via wireless communication. Alternatively, at least some of these application programs may exist on the mobile terminal 10 from the time of shipment for the basic functions (for example, incoming call, outgoing call, incoming message, and outgoing message functions) of the mobile terminal 10. On the other hand, at least one of these application programs may be an application for cosmetic dispensing.

The power supply unit 16 receives external power or internal power and supplies power to each component included in the mobile terminal 10. The power supply unit 16 includes a battery, which may be a built-in battery or a replaceable battery.

The control unit 17 controls the overall operation of the mobile terminal 10. Specifically, the control unit 17 can control an operation of each component constituting the mobile terminal 10 or an operation related to the application program. The control unit 17 can provide or process information or functions suitable to the user by processing signals, data, information, or the like input or output through the components described above or driving an application program stored in the memory 15. The control unit 17 may control at least some of the components described above or may operate at least two of the components in combination with each other.

The mobile terminal 10 described herein may include a mobile phone, a smart phone, a computer, a notebook computer, a tablet PC, a wearable device, a digital TV, a digital signage, skin diagnostic devices, or the like.

At least some of the components described above with reference to FIG. 2 may operate in cooperation with one another to implement an operation, control, or a control method of a mobile terminal according to various embodiments described below. Also, an operation, control, or a control method of the mobile terminal may be implemented on the mobile terminal by running at least one application program stored in the memory 15.

Next, a configuration and a role of the cosmetic dispenser 100 according to the embodiment of the present invention will be described in detail with reference to FIG. 3.

FIG. 3 is a block diagram illustrating a configuration of a cosmetic dispenser according to an embodiment of the present invention.

The cosmetic dispenser 100 according to the embodiment of the present invention may include an input unit 110, a display unit 120, a storage unit 130, a sensing unit 140, a camera 145, a position detection unit 147, cosmetic dispensing unit 150, a first bi-directional communication unit 160, and a second communication unit 170. The components listed above are merely illustrative for description of the cosmetic dispenser according to the embodiment of the present invention and the cosmetic dispenser 100 may have more or fewer components than the components listed above.

Hereinafter, each component of the cosmetic dispenser 100 will be described in more detail.

The input unit 110 may receive a data input instruction related to cosmetic dispensing.

Although the data relating to the cosmetic dispensing may include a dispensing amount, use, a dispensing time, cosmetic type, and cosmetic raw material, this is merely illustrative and may include all data available for cosmetic dispensing.

The input unit 110 may receive a data input instruction related to a cartridge 151 (see FIG. 5) mounted on the cosmetic dispenser 100. For example, the input unit 110 may receive an instruction for inputting information on the cosmetics contained in the cartridge 151, information on the installation date of the cartridge 151, and the like. Alternatively, the information listed above may be automatically sensed by a sensing unit 140 described below.

The input unit 110 may include at least one of an image input unit, an audio input unit, a mechanical key input unit, a touch key input unit, a pupil recognition input unit, and the like.

The display unit 120 may display data related to the cosmetic dispensing. Specifically, the display unit 120 may display a guidance screen for receiving a data input instruction related to the cosmetic dispensing. Alternatively, although the display unit 120 may display information input to the input unit 110, information on the dispensed cosmetics, information related to the makeup method, and the like, this is merely illustrative.

According to one embodiment, the display unit 120 may be implemented as a touch screen. In this case, the display unit 120 may perform a function as the input unit 110 together.

According to another embodiment, the display unit 120 may be implemented as a mirror display. The display unit 120 may include a mirror film and in this case, the display unit 120 may function as a mirror and visually display information at the same time.

More specifically, the display unit 120 may include a coating film, an upper polarizer, a liquid crystal display panel, a polarizer, and a back light and the mirror film may be positioned on the upper polarizer.

Accordingly, in a case where the user views the display unit 120 of the cosmetic dispenser 100, the user may receive the cosmetic-related information and check the face of the user, at the same time. In a case where the display unit 120 of the cosmetic dispenser 100 is a mirror display, there is an advantage that the user can receive the cosmetic-related information, the makeup method, or the like while viewing the face of the user to easily receive beauty-related help.

The storage unit 130 may include at least one of the cartridge information, the cosmetic-related data, and the makeup method.

The cartridge information may include at least one of a cosmetic type, remaining amount information, cartridge mounting date information, number of mounted cartridges, and the like corresponding to at least one cartridge mounted on the cosmetic dispenser 100.

The cosmetic-related data may include a cosmetic dispensing method including at least one of the cosmetic type, the cosmetic dispensing order, and the like. More specifically, although the storage unit 130 may store the popular cosmetic dispensing method, the most recently used cosmetic dispensing method, the most frequently used cosmetic dispensing method, an expert-recommended cosmetic dispensing method, or the like, this is merely illustrative. The storage unit 130 may store a user-related cosmetic dispensing method similar to that listed above.

The storage unit 130 may store data supporting various functions of the cosmetic dispenser 100. The storage unit 130 may store a plurality of application programs running on the cosmetic dispenser 100, data for operating the cosmetic dispenser 100, and instructions. These application programs, data, and instructions may be downloaded from the outside or may exist in the cosmetic dispenser 100 from the time of shipment.

The sensing unit 140 may sense the cartridge 151 (see FIG. 4) mounted on the cosmetic dispenser 100. The sensing unit 140 may sense the number of cartridges mounted on the cosmetic dispenser 100, the cosmetic type contained in the cartridges, the remaining amount of the cartridges, and the installation date of the cartridges.

According to one embodiment, the sensing unit 140 may transmit a signal toward the cartridge 151 and then may receive the reflection signal corresponding to the transmission signal, and may sense the remaining amount of the cartridge based on the difference between the transmission time and the reception time. In this case, the sensing unit 140 may be positioned on an extension line of the direction in which the cosmetics are discharged from the plurality of cartridges 150. For example, in a case where the cosmetics contained in the cartridge 151 are mounted so as to be discharged downward, the sensing unit 140 may be positioned at an upper portion or a lower portion of the cartridge 151. In a case where the cosmetics contained in the cartridge 151 are mounted so as to be discharged in the lateral direction, the sensing unit 140 may be mounted in parallel to the cartridge 151 in the horizontal direction.

According to another embodiment, the sensing unit 140 is implemented as a load cell and may sense the weight of the cartridge 151 thereon to sense the remaining amount of the cartridge. In this case, the sensing unit 140 may be mounted on the lower portion of the cartridge 151.

However, the method described above is merely illustrative and the sensing unit 140 can sense the remaining amount of the cartridge 151 in various manners.

In addition, the sensing unit 140 may receive a bar code input signal, a radio frequency identification (RFID) input signal, or the like included in the cartridge 151 when the cartridge 151 is mounted and can sense the number of cartridges, the cosmetic type contained in the cartridge, the installation date of the cartridge, the manufacturing date (or expiration date) of the cosmetics contained in the cartridge, and the like.

The cartridge related information listed above may be received through the input unit 110 in addition to the sensing unit 140.

The camera 145 may image the face of the user. Specifically, the camera 145 may image a no makeup face of the user or a makeup face of the user. The control unit 180 can acquire the cosmetic dispensing method based on the face of the user imaged by the camera 145. For example, the control unit 180 may acquire a cosmetic dispensing method from foundation makeup to color makeup in a case where the no makeup face of the user is imaged. In addition, the control unit 180 may acquire a makeup correction method or an additional cosmetic dispensing method in a case where a state of the makeup face of the user is imaged.

The position detection unit 147 may acquire a current position of the user. Although the position detection unit 147 may include a Global Positioning System (GPS), this is merely illustrative and all devices that can acquire the current position of the user may be included therein.

When the position detection unit 147 acquires the current position of the user, the control unit 180 may acquire weather information, surrounding information, and the like corresponding to the current position of the user. The control unit 180 may acquire the cosmetic dispensing method based on the weather information, the surrounding information, and the like corresponding to the acquired current position.

The cosmetic dispensing unit 150 may dispense the cosmetics using at least one cosmetic raw material.

The cosmetic dispensing unit 150 may include a cartridge 151, a nozzle unit 152, a mixer unit 153, a discharging unit 154, and a refrigerating unit 155.

The cartridge 151 may receive cosmetics. Here, the cosmetics contained in the cartridge 151 may include each of a finished product constituted as one product formed by a plurality of cosmetic raw materials, a semi-finished product of which some cosmetic raw materials are omitted, and cosmetic raw materials.

In a case where the cosmetic dispenser 100 includes a plurality of cartridges 151, each cartridge 151 may receive one of the finished product, the semi-finished product, or the cosmetic raw materials.

The plurality of cartridges 151 may be configured for each cosmetic type. Specifically, the plurality of cartridges 151 may be foundation cosmetic cartridges. For example, the foundation cosmetic cartridges may include a skin (toner) cartridge, an essence (serum) cartridge, a lotion (emulsion) cartridge, an eye cream cartridge, a day/night cream cartridge, and a sunscreen cartridge. The control unit 180 may acquire the cosmetic type and the cosmetic amount to be dispensed from the foundation cosmetic cartridge based on the user information, the environmental information, or the like. For example, the control unit 180 may acquire a cosmetic dispensing method in which 5 g from the skin cartridge, 3 g from the essence cartridge, 5 g from of the lotion cartridge, and 7 g from the sunscreen cartridge are dispensed in order.

On the other hand, the plurality of cartridges 151 may be color cosmetic cartridges. For example, the color cosmetic cartridges may include a makeup base cartridge, a foundation cartridge, a concealer cartridge, a powder compact cartridge, an eyebrow cartridge, an eye shadow cartridge, an eyeliner cartridge, a mascara cartridge, a blusher/highlighter cartridge, and a lipstick cartridge. The control unit 180 may acquire the cosmetic type and the cosmetic amount to be dispensed from the color cosmetic cartridge based on the user information, the environmental information, or the like.

Alternatively, the plurality of cartridges 151 may include both the foundation cosmetic cartridge and the color cosmetic cartridge. In this case, the control unit 180 may acquire a cosmetic dispensing method which provides cosmetics from each of the foundation cosmetic cartridges and cosmetics in each of the color cosmetic cartridges.

The cartridge 151 may be mounted on a cartridge supporting portion (not illustrated) and may be detached from the cartridge supporting portion. For example, when all the cosmetics contained in the cartridge 151 are consumed, the cartridge 151 may be detached from the cartridge supporting portion and a new cartridge 151 may be inserted into the cartridge supporting portion. Alternatively, when all of the cosmetics contained in the cartridge 151 are consumed, the cartridge 151 may be refilled with cosmetics. The cosmetics can be refilled both in a state where the cartridge 151 is mounted on the cartridge supporting portion or is separated therefrom.

Cosmetic discharge hole (not illustrated) may be formed on the cartridge 151 and the cosmetics contained in the cartridge 151 may be discharged to the nozzle unit 152 through the cosmetic discharge hole (not illustrated).

According to one embodiment, the nozzle unit 152 may be connected to the discharging unit 154. Therefore, the cosmetics housed in the cartridge 151 may pass through the nozzle unit 152 and may be discharged to the outside through the discharging unit 154.

According to another embodiment, the nozzle unit 152 may be connected to the cartridge 151 and the mixer unit 153. The nozzle unit 152 may be a passage through which the cosmetics move from the cartridge 151 to the mixer unit 153. The cosmetics discharged from the cartridge 151 can be moved to the mixer unit 153 through the nozzle unit 152.

The mixer unit 153 may uniformly mix at least one cosmetic. The mixer unit 153 is provided with a vibration device (not illustrated) or the like and may discharge the cosmetic raw material contained in the mixer unit 153.

The discharging unit 154 can discharge the cosmetics that are moved from the cartridge 151 through the nozzle unit 154 to the outside.

Alternatively, in a case where the cosmetic dispensing unit 150 includes the mixer unit 154, the discharging unit 154 may discharge the cosmetics mixed in the mixer unit 153 to the outside of the cosmetic dispenser 100.

The discharging unit 153 may be implemented as a pump and discharge cosmetics to the outside of the cosmetic dispenser 100.

The refrigerating unit 155 may maintain a temperature of the cosmetics housed in the cartridge 151 at the set temperature. The refrigerating unit 155 may be configured to receive the cartridge 151 therein. Alternatively, the refrigerating unit 155 may be formed around the cartridge 151.

The components listed above are merely illustrative, and the cosmetic dispensing unit 150 may further include other components required for dispensing cosmetics, or some components may be omitted.

The first bi-directional communication unit 160 may transmit and receive signals between the cosmetic dispenser 100 and an external server or an external device. In other words, the first bi-directional communication unit 160 may transmit and receive signals between the cosmetic dispenser 100 and the server 1 or transmit and receive signals between the cosmetic dispenser 100 and the mobile terminal 10.

For example, the first bi-directional communication unit 160 may transmit the input cosmetic provision information to the server 1 and may receive the environmental information such as weather and the cosmetic dispensing method from the server 1. Alternatively, the first bi-directional communication unit 160 may transmit the remaining amount information on the cartridge to the mobile terminal 10 and may receive the user information such as a schedule and the cosmetic dispensing instruction from the mobile terminal 10. However, this is merely illustrative and the first bi-directional communication unit 160 can transmit and receive various signals related to cosmetic dispensing to and from an external server or an external device.

The first bi-directional communication unit 160 may transmit and receive signals to and from the outside using at least one of the mobile communication technology, the wireless Internet technology, and the local communication technology described above.

The second communication unit 170 can receive information on the ready-made cosmetics.

The ready-made cosmetics refer to commercial cosmetics manufactured already and sold in bulk and the ready-made cosmetics may include bar codes or RFID chips.

The second communication unit 170 may be implemented as a bar code reader or a RFID reader and may recognize the ready-made cosmetics including a bar code or a RFID chip. When the second communication unit 170 recognizes the ready-made cosmetics, the information on the recognized ready-made cosmetics may be received. In this case, unlike the first bi-directional communication unit 160, the second communication unit 170 can transmit and receive signals in a single direction.

When the second communication unit 170 receives the information on the ready-made cosmetics, the control unit 180 may provide the cosmetics in consideration of the ready-made cosmetics based on the received ready-made cosmetic information and may display a use method of the ready-made cosmetics. A detailed description thereof will be described below.

In addition, in a case where the second communication unit 170 recognizes the bar code or the RFID chip, the second communication unit 170 may receive the manufacturing date (or expiration date) of the ready-made cosmetics. The control unit 180 can inform the user of a replacement time of the cosmetics through the manufacturing date (or expiration date) of the received ready-made cosmetics.

The control unit 180 may control the overall operation required for dispensing the cosmetics. The control unit 180 may control individual operations of each of the components constituting the cosmetic dispenser 100 or may control the operations to be combined with each other.

The operation of each component described above is exemplary and each component can perform various operations related to cosmetic dispensing.

The cosmetic dispenser 100 may be implemented as a stationary or a portable cosmetic dispenser. The stationary cosmetic dispenser 100 may mount a relatively large number of the cartridges 151 as compared with the portable cosmetic dispenser and thus the stationary cosmetic dispenser 100 has an advantage that various cosmetics can be provided therein. Since the portable cosmetic dispenser 100 is easy to carry, the portable cosmetic dispenser 100 has an advantage that cosmetics suitable for various situations may be manufactured and used immediately after going out.

Next, the cosmetic dispenser implemented as a stationary cosmetic dispenser will be described with reference to FIG. 4 and FIG. 5. FIG. 4 is an exemplary view of a stationary cosmetic dispenser according to a first embodiment of the present invention and FIG. 5 is an exemplary view of a stationary cosmetic dispenser according to a second embodiment of the present invention.

First, with reference to FIG. 4, the cosmetic dispenser 100 may include an input unit 110, a display unit 120, a storage unit 130, a sensing unit 140, cosmetic dispensing unit 150, a first bi-directional communication unit 160, a second communication unit 170, and a control unit 180.

In the input unit 110, the display unit 120, the storage unit 130, the sensing unit 140, the cosmetic dispensing unit 150, the first bi-directional communication unit 160, the second communication unit 170, and the control unit 180, the same contents as those described in FIG. 3 will be omitted.

The cosmetic dispenser 100 may be provided with a discharge space S1 in which the cosmetics are discharged.

The user may be provided the cosmetics discharged from the discharge space S1 to hands of the user or to the container.

The discharge space S1 may be formed between an upper body 100*a* and a lower body 100*b* of the cosmetic dispenser 100. In other words, the cosmetic dispenser 100 includes the upper body 100*a* and the lower body 100*b* and a discharge space S1 may be formed between the upper body 100*a* and the lower body 100*b*. The upper body 100*a* and the lower body 100*b* may be connected to each other.

The cosmetic dispensing unit 150 may be positioned adjacent to the discharge space S1. More specifically, the cosmetic dispensing unit 150 may be mounted such that one surface thereof formed in the discharging unit 154 faces the discharge space S1. Accordingly, cosmetics may be discharged from the cosmetic dispensing unit 150 to the discharge space S1.

The cosmetic dispensing unit 150 may include a plurality of cartridges 151. Each of the plurality of cartridges 151 may include only foundation cosmetics or only color cosmetics. Alternatively, the cosmetic dispensing unit 150 may include both the cartridge 151 containing the foundation cosmetics and the cartridge 151 containing the color cosmetics.

The cosmetics contained in the plurality of cartridges 151 may be discharged through one discharging unit 154 in order. In other words, the foundation cosmetics are discharged the makeup order and the color cosmetics can be discharged in the makeup order from the discharging unit 154.

With reference to FIG. 4, the sensing unit 140 may be positioned above the cosmetic dispensing unit 150, the sensing unit 140, the first bi-directional communication unit 160, the second communication unit 170, the control unit 180 may be positioned in the lower body 100*a*, and the input unit 110 and the storage unit 130 may be positioned in the lower body 100*b*. However, this is merely illustrative and the shape of the cosmetic dispenser 100 illustrated in FIG. 4 and the position of each component included in the cosmetic dispenser 100 may be different from those illustrated in FIG. 4. In other words, although it is described that the input unit 110 is positioned on an upper surface of the lower body 100*b* as an example, the input unit 110 may be positioned in the upper body 100*a*. The refrigeration unit (not illustrated) may be formed to accommodate a plurality of cartridges 151 therein.

Meanwhile, the cosmetic dispenser 100 may include a plurality of cosmetic dispensing units 150. With reference to FIG. 5, the at least one cartridge 151, the nozzle unit 152, the mixer unit 153, and the discharging unit 154 constitute a cosmetic dispensing unit set and the cosmetic dispenser 100 includes a plurality of cosmetic dispensing unit sets. In this case, each cosmetic dispensing unit set may be implemented as a foundation cosmetic dispensing unit and a color cosmetic dispensing unit.

Next, the cosmetic dispenser which is implemented as a portable cosmetic dispenser will be described with reference to FIG. 6. FIG. 6 is an exemplary view of a portable cosmetic dispenser according to an embodiment of the present invention.

With reference to FIG. 6, the portable cosmetic dispenser 100 may include an input unit 110, a display unit 120, cosmetic dispensing unit 150, a first bi-directional communication unit 160, a second communication unit 170, and a control unit 180. The portable cosmetic dispenser 100 may be smaller in size and may include fewer components than the stationary cosmetic dispenser 100. However, the components listed above are merely illustrative and the portable cosmetic dispenser 100 may include more components. In addition, since the same components as those described above with reference to FIG. 3 are the same as those described above, a detailed description thereof will be omitted.

There is an advantage that the portable cosmetic dispenser 100 has a light weight and easy portability and can manufacture required cosmetics and dispense the cosmetics to the user according to situations.

The cosmetic dispensing unit 150 of the portable cosmetic dispenser 100 may be mounted such that one surface of the discharging unit 154 is formed on an outside surface of the cosmetic dispenser 100. Accordingly, the cosmetics manufactured in the cosmetic dispensing unit 150 may be discharged to the outside of the cosmetic dispenser 100 and the user may be provided with the discharged cosmetics.

The positional relationship between the input unit 110, the display unit 120, the cosmetic dispensing unit 150, the first bi-directional communication unit 160, the second communication unit 170, and the control unit 180 of the portable cosmetic dispenser 100 illustrated in FIG. 6 and the shape of the cosmetic dispenser 100 are merely illustrative and may be different from those illustrated in FIG. 6.

Next, a method for operating the cosmetic dispensing system according to the embodiment of the present invention will be described with reference to FIG. 7 to FIG. 16. The cosmetic dispenser 100 described below may include both a stationary cosmetic dispenser and a portable cosmetic dispenser.

FIG. 7 is a diagram illustrating a method for operating a cosmetic dispensing system according to an embodiment of the present invention.

The server 1 may transmit data related to cosmetic dispensing to the cosmetic dispenser 100 (S101).

The data relating to the cosmetic dispensing may refer to the data necessary to acquire the cosmetic dispensing method and may include cosmetic effects according to the cosmetic type, the makeup order, the cosmetic amount, and the like.

The cosmetic dispenser 100 may receive data related to cosmetic dispensing from the server 1.

The server 1 can receive environmental information (S103). The server 1 can transmit the received environmental information to the cosmetic dispenser 100 (S105).

The environmental information refers to information related to a current atmospheric state, weather, or the like and the environmental information may include current temperature, humidity, fine dust concentration, ultraviolet ray index, amount of cloud, and the like.

The server 1 may receive the environmental information from outside such as a weather station.

Alternatively, the mobile terminal 10 may receive the environmental information from the outside and transmit the environmental information to the server 1, and the server 1 may also receive the environmental information from the mobile terminal 10.

The mobile terminal 10 can receive an input instruction of user information (S107). The mobile terminal 10 may transmit the received user information to the cosmetic dispenser 100 (S109).

The user information may include a skin condition, a face image, a schedule of the user, an alarm, and the like.

The mobile terminal 10 can image a skin or a face of the user through the camera 13 to acquire a skin condition or a face image.

Alternatively, the mobile terminal 10 may receive a schedule input instruction or an alarm input instruction through the input unit 12. Here, the schedule input instruction may mean an instruction for inputting at least one of date, time, place and job contents related to the scheduled work of the user and the alarm input instruction may mean an instruction for inputting at least one of time and job contents related to a daily or weekly repeated work such as a wake-up time of the user.

With reference to FIG. 8, information acquired as the mobile terminal 10 according to an embodiment of the present invention receives a schedule input instruction will be described. FIG. 8 is a view explaining an example of the user information received by a mobile terminal according to an embodiment of the present invention.

The mobile terminal 10 may receive the schedule input instruction through the input unit 12. Specifically, the input unit 12 of the mobile terminal 10 may receive an instruction for inputting at least one of a date, a time, a place and job contents associated with the scheduled job to the user.

The display unit 14 of the mobile terminal 10 may display contents corresponding to the received schedule input instruction.

The input unit 12 may receive a first schedule input instruction including April 19, 10:00 and a customer meeting, receive a second schedule input instruction including April 22, 12:30 and XX wedding, and a third schedule including April 28, 19:00 and a friend gathering.

The display unit 14 of the mobile terminal 10 may display contents corresponding to the first schedule input instruction, the second schedule input instruction, and the third schedule input instruction, which are received. In other words, as illustrated in FIG. 8, the display unit 14 may display 04/19 10:00 customer meeting, 04/22 12:30 XX wedding, and 04/28 19:00 friend gathering. However, this is merely illustrative and the mobile terminal 10 may receive and display more schedule input instructions than the schedule illustrated in FIG. 8. In addition, the schedule display method illustrated in FIG. 8 is merely illustrative and may be displayed in other manners.

The mobile terminal 10 may receive various input instruction of the user information in addition to the schedule input instruction described above.

Again, FIG. 7 will be described.

The sensing unit 140 of the cosmetic dispenser 100 can sense the remaining amount of the cartridge 151 (S37).

The sensing unit 140 of the cosmetic dispenser 100 may transmit a signal toward the cartridge 151 and receive a reflection signal corresponding to the transmission signal. The control unit 180 may calculate the difference between the time when the signal is transmitted to the cartridge 151 and the time when the reflected signal is received and may sense the remaining amount of the cartridge based on the calculated difference between the transmission time and the reception time.

However, this is merely illustrative and the sensing unit 140 may be a weight measuring sensor that may measure the weight of each of the at least one cartridges 151 and may measure the weight of each of the cartridges 151 so that the remaining amount of the cartridges may be sensed.

The display unit 120 of the cosmetic dispenser 100 may display the remaining amount of the sensed cartridge.

Alternatively, the first bi-directional communication unit 160 of the cosmetic dispenser 100 may transmit the sensed remaining amount information on the cartridge to the mobile terminal 10 (S113).

The mobile terminal 10 may display the remaining amount information on the cartridge (S115). A method for displaying the remaining amount information on the cartridge by the mobile terminal 10 will be described below with reference to FIG. 14.

As described above, according to an embodiment of the present invention, the cosmetic dispenser 100 may sense the remaining amount of the cartridge and provide the user with a replacement time of the cosmetics (cartridge).

Meanwhile, according to another embodiment of the present invention, the cosmetic dispenser 100 can provide the user with cosmetic replacement period based on the cosmetic manufacturing date or the cosmetic expiration date.

Specifically, the cosmetic dispenser 100 may acquire at least one of the installation date of the cartridge, the manufacturing date or the expiration date of the cosmetics contained in the cartridge, and the manufacturing date or the expiration date of the ready-made cosmetics through the sensing unit 140 or the second communication unit 170. The control unit 180 may control to output cosmetic replacement alarm in a case where the installation date of the cartridge, the manufacturing date of the cosmetics contained in the cartridge, or the manufacturing date of the ready-made cosmetics exceeds a predetermined reference period. Alternatively, the control unit 180 may control to be output the cosmetic replacement alarm in a case where the current date is equal to or shorter than the expiration date of the cosmetics contained in the cartridge or the expiration date of the ready-made cosmetics.

The control unit 180 may display a replacement alarm on the display unit 120 or may transmit a replacement alarm signal to the mobile terminal 10.

The cosmetic dispenser 100 can recognize the information on the ready-made cosmetics (S117).

The ready-made cosmetics represent commercial cosmetics which are manufactured and sold by cosmetic companies or the like. The ready-made cosmetics may include bar codes or RFID tags.

The cosmetic dispenser 100 may include a second communication unit 170 for recognizing the ready-made cosmetics. The second communication unit 170 may be a bar code recognition device or a RFID reader.

Next, with reference to FIG. 9, a method for recognizing the information on the ready-made cosmetics by the cosmetic dispenser 100 will be described. FIG. 9 is a view explaining a method for recognizing information on the ready-made cosmetics by the cosmetic dispenser according to an embodiment of the present invention.

The display unit 120 of the cosmetic dispenser 100 may display a screen for recognizing the ready-made cosmetics. As illustrated in FIG. 9, the display unit 120 may display a ready-made cosmetic recognition message 1010, and the ready-made cosmetic recognition message 1010 may indicate the recognition timing and the recognizable position of the ready-made cosmetics. The recognizable position of the ready-made cosmetics may be positioned adjacent to the second communication unit 170.

The user may place the ready-made cosmetics 1020 on a position adjacent to the second communication unit 170. The second communication unit 170 may recognize the bar code or the RFID tag built in the ready-made cosmetics 1020 and may receive the information on the ready-made cosmetics 1020 as result of the recognition thereof.

In this manner, the user may recognize possessed cosmetics by the second communication unit 170 and acquire a method for using the possessed cosmetics.

Again, FIG. 7 will be described.

When the information on the ready-made cosmetics 1020 is received by the cosmetic dispenser 100, the cosmetic dispenser 100 may acquire the cosmetic dispensing method based on at least one of the user information, the environmental information, the remaining amount information on the cartridge, and the ready-made cosmetic information (S119).

In a case where the cosmetic dispenser 100 does not receive the information on the ready-made cosmetics 1020, the cosmetic dispenser 100 may acquire the cosmetic dispensing method based on at least one of the user information, the environmental information and the remaining amount information on the cartridge (S121).

The control unit 180 may acquire the cosmetic dispensing method based on at least one of the information on the skin condition, the face image of the user, the schedule, the alarm, the current temperature, the humidity, the fine dust concentration, the ultraviolet ray index, and the ready-made cosmetics.

The cosmetic dispensing method may include the cosmetic type to be dispensed, the cosmetic amount to be dispensed, the cosmetic dispensing order, the cosmetic dispensing time, and the like.

Specifically, when the control unit 180 receives the schedule information from the mobile terminal 10, the control unit 180 may acquire different cosmetic dispensing methods from each other according to the schedule information. For example, the control unit 180 may receive 'April 19, 10:00 customer meeting' information, 'April 22, 12:30 XX wedding' information, and 'April 28, 19:00 friend gathering' information and the control unit 180 can acquire a cosmetic dispensing method that matches the date included in the received information and the schedule contents included in the received information.

For example, the control unit 180 can recognize predetermined specific characters such as 'meeting', 'wedding', 'gathering', and the like. According to one embodiment, the control unit 180 may acquire a recognized specific character-mapped cosmetic dispensing method when a specific character is recognized. According to another embodiment, the control unit 180 may recommend a perfume or specific cosmetics to a schedule which is recognized by the specific character.

Alternatively, when the control unit 180 receives the alarm information from the mobile terminal 10, the control unit 180 can acquire a cosmetic dispensing method in which the cosmetics are manufactured according to the alarm time. Specifically, when the control unit 180 receives the 'am T o'clock wake up' information from the mobile terminal 10, the control unit 180 may acquire a cosmetic dispensing method in which the cosmetics are manufactured after a predetermined time based on the received time. For example, when the control unit 180 receives the 'am 7 o'clock wake up' information from the mobile terminal 10, a cosmetic provision method in which the control unit 180 controls the cosmetics to be manufactured at 8 o'clock after the predetermined time based on the received time, that is, 7 o'clock may be acquired.

When the environmental information such as humidity and ultraviolet ray index is received, the control unit 180 may acquire a cosmetic dispensing method by adjusting the moisture content cosmetic raw materials and the sun block functional cosmetic raw materials according to the humidity, the ultraviolet ray index and the like.

The control unit 180 may acquire the cosmetic dispensing method considering the remaining amount of the cartridge. Specifically, the control unit 180 may limit the cosmetic amount having the remaining amount of the cartridge less than the predetermined remaining amount to a predetermined usage amount or less.

When the control unit 180 receives the information on the ready-made cosmetics, the control unit 180 may acquire a cosmetic dispensing method that may use the received ready-made cosmetics in combination with the cosmetics contained in the cartridge 151.

Alternatively, the control unit 180 may acquire a cosmetic dispensing method using only ready-made cosmetics in a case where the control unit 180 receives information on the ready-made cosmetics.

However, this is merely illustrative and the mobile terminal 10 or the server 1 may acquire a cosmetic dispensing method. For example, the mobile terminal 10 may receive at least one of the user information, the environmental information, and cosmetic provision information to acquire a cosmetic dispensing method. The manner in which the server 1 acquires the cosmetic dispensing method will be described below in FIG. 15.

The display unit 120 may display the cosmetic dispensing method (S123).

With reference to FIG. 10a to FIG. 10d, a method for displaying a cosmetic dispensing method according to an embodiment of the present invention will be described.

As illustrated in FIG. 10a, the display unit 120 displays the user information 901, the cartridge remaining amount information 902, the environmental information 903, the possessed cosmetic information 904, and the cosmetic information 905 to be dispensed, a correction icon 906, and a dispensing icon 907.

The user information 901 may be information received from the mobile terminal 1, the cartridge information 902 may be the result information acquired by sensing the remaining amount of the cartridge, the environmental information 903 may be environmental information received from the server 1, and the possessed cosmetic information 904 may be information on recognition result of the ready-made cosmetics.

The cosmetic information 905 to be dispensed may include a cosmetic dispensing method acquired based on at least one of the user information, the environmental information, the remaining amount information on the cartridge, and information on ready-made cosmetics. Specifically, the cosmetic information 905 to be dispensed includes the cosmetic type, the cosmetic provision amount, and the cosmetic provision order.

The cosmetic information 905 to be dispensed may include a check box 905a. The check box 905a may be a check box for selecting cosmetics to be corrected or selecting cosmetics to be dispensed.

The correction icon 906 is an icon for correcting the cosmetics displayed in the cosmetic information 905 to be dispensed. The control unit 180 may display a screen for correcting the cosmetics selected by the check box 905*a* when the correction icon 906 is selected.

The dispensing icon 907 is an icon for dispensing cosmetics according to the dispensing method displayed in the cosmetic information 905 to be dispensed. When the control unit 180 receives the instruction to select the dispensing icon 907, the control unit 180 can dispense the cosmetics displayed in the check box 905*a*.

FIG. 10*a* is an exemplary screen displaying a cosmetic dispensing method using only the cosmetics contained in the cartridge 151.

Therefore, the cosmetic information 905 to be dispensed illustrated in FIG. 10*a* displays the cosmetic information to be provided through the cartridge 151.

On the other hand, the cosmetic dispenser 100 may acquire a cosmetic dispensing method using both the cosmetics contained in the cartridge 151 and the possessed cosmetics.

FIG. 10*b* is an exemplary screen representing a cosmetic dispensing method using both the cosmetics contained in the cartridge 151 and the possessed cosmetics.

Even in this case, the display unit 120 may display the user information 901, the cartridge remaining amount information 902, the environmental information 903, the possessed cosmetic information 904, and the cosmetic information 905 to be dispensed, the correction icon 906, and the dispensing icon 907, similar to those described in FIG. 10*a*. The same contents as those described in FIG. 10*a* will be omitted.

The control unit 180 may acquire a cosmetic dispensing method using both the possessed cosmetics and the cosmetics dispensed through the cartridge 151. In this case, as in the example illustrated in FIG. 10*b*, the control unit 180 may recognize a specific cosmetics through recognition of the ready-made cosmetics 1020, may acquire the cosmetic dispensing method including the use order of the recognized and specified cosmetics and may display the cosmetic information 905 to be dispensed. The cosmetic information 905 to be dispensed includes both the information on the possessed cosmetics and the cosmetics provided through the cartridge 151.

According to one embodiment, as illustrated in FIG. 10*b*, the cartridge 151 may include both foundation cosmetics and color cosmetics.

According to another embodiment, the cartridge 151 may include only the foundation cosmetics. For example, the color cosmetics may be difficult to provide through the cartridge 151. In this case, as in the example illustrated in FIG. 10*c*, the control unit 180 can display both cosmetic information 905*b* which can be dispensed through the cartridge 151 and information 905*d* using the possessed cosmetics.

According to another embodiment, the control unit 180 may acquire a cosmetic dispensing method using only the possessed cosmetics by the control unit 180. For example, the control unit 180 can acquire a cosmetic dispensing method including only the possessed cosmetics as a result of recognition of the possessed cosmetics. In this case, as in the example illustrated in FIG. 10*d*, the display unit 120 may display the cosmetic information 905 to be dispensed, which includes only the possessed cosmetics. Although the cosmetic information 905 to be dispensed may display the possessed cosmetic type in accordance with the use order of the possessed cosmetics, since cosmetic information 905 to be dispensed described above is merely illustrative, cosmetic information 905 to be dispensed is not limited thereto.

Again, FIG. 7 will be described.

The control unit 180 may receive a cosmetic correction instruction to be dispensed (S125).

The control unit 180 may receive an instruction to select the correction icon 906 illustrated in FIGS. 10*a* to 10*d*.

When the control unit 180 receives the cosmetic correction instruction to be dispensed, the control unit 180 may correct the cosmetic dispensing method (S127).

In a step of correcting the cosmetic dispensing method, the control unit 180 may receive an input instruction of cosmetic provision information for setting the cosmetic provision amount, the cosmetic use, the cosmetic type, and the like. The input instruction of the cosmetic provision information will be described below with reference to FIG. 15.

The control unit 180 can dispense cosmetics according to the corrected cosmetic dispensing method (S129). Alternatively, when the control unit 180 receives the cosmetic dispensing instruction in step S125, the control unit 180 may dispense the cosmetics according to the cosmetic dispensing method.

The control unit 180 can receive an instruction to select the dispensing icon 907 illustrated in FIG. 10*a* to FIG. 10*d*.

FIG. 11 is a view explaining a state where a cosmetic dispenser according to an embodiment of the present invention dispenses cosmetics manufactured according to the cosmetic dispensing method.

The cosmetic dispensing unit 150 may control so that the cosmetics contained in each of at least one cartridge 151 are discharged from the discharging unit 154 to the outside through the nozzle unit 152 based on the cosmetic dispensing method. In a case where the cosmetic dispensing unit 150 includes the mixer unit 153, the cosmetics contained in each of the at least one cartridges 151 may be controlled to be moved to the mixer unit 153 through the nozzle unit 152, to be mixed in the mixer unit 152, and to be discharged from the discharging unit 154 to the outside.

The display unit 120 of the cosmetic dispenser 100 can display discharge timing when the cosmetics 1100 is discharged. Accordingly, the user may receive and use the cosmetics 1100 in accordance with the dispensing timing.

Alternatively, a cosmetic container (not illustrated) may be disposed below the discharging unit 154. The cosmetics 1100 discharged from the discharging unit 154 can be accommodated in the cosmetic container (not illustrated). The user can immediately use the cosmetics accommodated in the cosmetic container (not illustrated) or carry the cosmetic container when going out.

The cosmetic dispenser 100 may display information on cosmetics dispensed while dispensing cosmetics.

Here, the cosmetic information may include an ingredient ratio of the cosmetics to be dispensed, the cosmetics use method, the efficacy of the cosmetics, or the like.

The cosmetic dispenser 100 may dispense at least one cosmetics based on the cosmetic dispensing method and may discharge the cosmetics in order in the case of a plurality of cosmetics.

Again, FIG. 7 will be described.

The display unit 120 of the cosmetic dispenser 100 may display cosmetic information corresponding to the cosmetics to be provided (S131).

The display unit 120 of the cosmetic dispenser 100 may display information on each ingredient of the cosmetics, usage information on the cosmetics, the efficacy information on the cosmetics, and the like.

Next, FIG. 12 is an exemplary view explaining a method for displaying information on cosmetics by the cosmetic dispenser according to an embodiment of the present invention. The cosmetic dispenser 100 may sequentially discharge first cosmetics, second cosmetics, and third cosmetics based on the cosmetic dispensing method. The first to third cosmetics may be finished products, semi-finished products or cosmetic raw materials. Although the first cosmetics may be cosmetics provided in the toner cartridge, the second cosmetics may be cosmetics provided in the lotion cartridge, and the third cosmetics may be cosmetics provided in the essence cartridge, it is merely illustrative.

The display unit 120 of the cosmetic dispenser 100 may display the cosmetic information 1210.

According to one embodiment, as illustrated in FIG. 12, the cosmetic information 1210 may include ingredient information on the first cosmetics, ingredient information on the second cosmetics, and ingredient information on the third cosmetics to be manufactured, respectively.

The display unit 120 of the cosmetic dispenser 100 may display a recommended makeup method 1220 along with the cosmetic information 1210. The recommended makeup method 1220 is a method for using the cosmetics to be dispensed and may include a cosmetic use position, a cosmetic use order, a cosmetic using amount, or the like. In the example of FIG. 12, the display unit 120 displays the use position and the use order of the first cosmetics, the second cosmetics, and the third cosmetics.

According to this, the cosmetic dispenser 100 has the effect of providing cosmetics and guiding the cosmetic use method at the same time.

Again, FIG. 7 will be described.

In a case where the cosmetic dispenser 100 acquires a cosmetic dispensing method using the ready-made cosmetics, the information corresponding to the ready-made cosmetics may be displayed (S133).

With reference to FIG. 13a to FIG. 13c, a method for displaying information corresponding to the ready-made cosmetics according to an embodiment of the present invention will be described.

First, FIG. 13a is a view explaining a ready-made cosmetic information display method according to the first embodiment of the present invention. As illustrated in FIG. 13a, the display unit 120 may display both the cosmetic information 1310 and the recommended makeup method 1320. The cosmetic information 1310 may include the ingredient information on the first cosmetics the ingredient information on the third cosmetics, and the ingredient information on the second cosmetics as the possessed cosmetics which are dispensed through the cartridge 151. Here, the possessed cosmetics may represent the cosmetics recognized in the information recognition step S21 of the ready-made cosmetics.

A recommended makeup method 1320 is a method for using the cosmetics to be dispensed along with the possessed cosmetics and may include the cosmetic using position, the cosmetic use order, the cosmetic using amount, and the like. In the example of FIG. 13a, the display unit 120 displays the use position of the first cosmetics dispensed, the use position of the second cosmetics which is the possessed cosmetics, and the use position and the use order of the third cosmetics.

According to this, there is an advantage that the cosmetics necessary for the user are manufactured and provided and a use method for the cosmetics possessed by the user is provided at the same time.

FIG. 13b is a view explaining the ready-made cosmetic information display method according to a second embodiment of the present invention.

The control unit 180 can acquire the cosmetic dispensing method using only the ready-made cosmetics.

As illustrated in FIG. 13b, the display unit 120 may display both the possessed cosmetics information 1330 and the recommended makeup method 1340. The cosmetic information 1330 may include names of at least one cosmetic. In addition, although not illustrated in FIG. 13b, the cosmetic information 1330 may include names of the cosmetics along with the recommended use cosmetic amount.

The recommended makeup method 1340 may include a use position, a use method, and the like of each possessed cosmetics displayed on the possessed cosmetics 1330.

FIG. 13c is a view explaining ready-made cosmetic information display method according to a third embodiment of the present invention.

The control unit 180 may acquire the cosmetic dispensing method using only the ready-made cosmetics. In this case, as illustrated in FIG. 13c, the display unit 120 may display the possessed cosmetics information 1350 along with the recommended cosmetic information 1360.

When the control unit 180 receives an instruction to select the cosmetics contained in the recommended cosmetic information 1360, the control unit 180 may display a method for purchasing the selected cosmetics. For example, the display unit 120 may display a website where the selected cosmetics may be purchased.

According to this, the cosmetic dispenser 100 has the advantage of being capable of using the possessed cosmetics and, at the same time, providing the user with the information on the recommended cosmetics which can be used together with the possessed cosmetics. On the other hand, in a case where it is difficult to provide the color cosmetics through the cartridge 151, as illustrated in FIGS. 13A to 13C, there is an effect that all processes relating the use of the cosmetics from the display of the cosmetic provision method to the display of the makeup method by displaying the information on the ready-made cosmetics can get help.

Next, FIG. 14 is an exemplary view explaining a method for outputting cartridge remaining amount information by a mobile terminal according to an embodiment of the present invention.

As illustrated in FIG. 14, the display unit 14 of the mobile terminal 10 may display remaining amount information 1401 of the first cartridge, remaining amount information 1402 of the second cartridge, remaining amount information 1403 of the third cartridge, remaining amount information 1404 of the fourth cartridge, remaining amount information 1405 of the fifth cartridge, and remaining amount information 1406 of the sixth cartridge.

Each of the remaining amount information 1401 to 1406 of the first to sixth cartridges may include the ratio of the cosmetics contained in each cartridge to the capacity of the cartridge 151.

In addition, the display unit 14 of the mobile terminal 10 may display a cartridge replacement notification and the cartridge replacement notification may be displayed corresponding to the cartridge whose remaining amount of the cartridge is less than the predetermined reference remaining amount.

The reference remaining amount of the cartridge replacement notification may be set by receiving the user input instruction through the input unit 110 or may be set to a default at the time of shipment of the cosmetic dispenser 100.

In a case of an example illustrated in FIG. 14, the reference remaining amount of the cartridge replacement notification may be 20% and the display unit 14 may display a replacement notification corresponding to the fifth cartridge 1405 which is less than the reference remaining amount.

The method for outputting the cartridge replacement notification may be a method for displaying in a different manner from the remaining amount information on the other cartridges as illustrated in FIG. 14. Alternatively, the control unit 17 of the mobile terminal 17 may output a replacement notification of a cartridge that is less than the reference remaining amount through sound or vibration.

Accordingly, there is an advantage that the cosmetic dispenser 100 guides the user to replace the cartridge 151 before the cosmetics are exhausted by the cosmetic dispenser 100 sensing the remaining amount of the cartridge 151 and transmitting the remaining amount information on the cartridge to the mobile terminal 10.

In addition, in a case where the mobile terminal 10 outputs a cartridge replacement notification, an icon for accessing a site where the cartridge corresponding to the cartridge replacement notification may be purchased may be displayed. There is an advantage that the user can easily purchase a cartridge having insufficient remaining amount through the cartridge purchase icon (not illustrated).

In FIGS. 7 to 14, an embodiment of acquiring the cosmetic dispenser 100 for acquiring the cosmetic dispensing method is described.

Next, FIG. 15 to FIG. 16 illustrate an embodiment in which the server 1 acquires the cosmetic dispensing method. However, the same or similar contents as those described with reference to FIG. 7 to FIG. 14 will be omitted.

With reference to the diagram illustrated in FIG. 15, the mobile terminal 10 may receive the input instruction of user information (S11).

The server 1 can receive the environmental information (S13).

The cosmetic manufacturing device 100 may receive the input instruction of the cosmetic provision information (S15).

The cosmetic provision information means information inputted by the user to set cosmetics to be dispensed arbitrarily and may include the cosmetic amount to be dispensed, the use (or purpose) of the cosmetics, cosmetic raw materials to be included in the dispensed cosmetics, and the like.

The cosmetic dispenser 100 may receive the input instruction of the cosmetic provision information through the input unit 110 and the display unit 120 may display the received cosmetic provision information.

On the other hand, the cosmetic dispenser 100 may receive the input instruction of the cosmetic provision information in the cosmetic dispensing method correction step such as S127 in FIG. 7 to correct the cosmetic dispensing method.

Next, with reference to FIG. 16, a method for receiving the input instruction of the cosmetic provision information by the cosmetic dispenser 100 will be described.

The display unit 120 of the cosmetic dispenser 100 may display a screen for receiving the input instruction of the cosmetic provision information as illustrated in FIG. 16. In other words, the display unit 120 may include a provision amount input item 910, a use input item 920, and cosmetic raw material selection item 930, and the use input item 920 may include a use input item 920a for foundation cosmetics and a use input item 920b for color cosmetics.

The provision amount input item 910 is an item for setting the cosmetic amount to be provided and may include sub-items such as 'one time', 'one day' and 'one week' as illustrated in FIG. 16. The 'one time' item may be an item to provide cosmetic amount for one time use, the 'one day item' may be an item to provide cosmetic amount for two to three time uses, and the 'one week item' may be an item to provide cosmetic amount for 15 to 20 time uses. However, these are merely illustrative and the provision amount input item 910 may include sub-items with quantified capacity such as '10 ml', '50 ml', '100 ml', or the like.

The use input item 920 is an item for setting a use or a purpose in which cosmetics to be provided is to be used and includes a use input item 920a for foundation cosmetics including sub-items such as 'for morning', 'for out-going' and 'for night' and a use input item 920b of color cosmetics including sub-items such as 'for office', 'for date' and 'for party'.

The cosmetic dispensing unit 150 may dispense a lot of cosmetics having a whitening function when the 'for morning' item is selected, dispense a lot of cosmetics having a sun block function when the 'for outgoing use' item is selected, and dispense a lot of cosmetics with high moisture content when the 'for night use' item is selected. However, these are merely illustrative. In addition, the cosmetic dispensing unit 150 may dispense red-based color cosmetics when the 'for office' item is selected, and dispense pink-based color cosmetics when the 'for date' item is selected, and dispense black-based color cosmetics when the 'for party' item is selected, but these are merely illustrative.

In other words, as illustrated in FIG. 16, the cosmetic dispensing unit 150 may distinguish the foundation cosmetics and the color cosmetics, dispense the cosmetics according to each selected sub-item or may dispense the cosmetics according to the selected sub-item without distinguishing the foundation cosmetics and the color cosmetics.

The cosmetic dispensing unit 150 may manufacture cosmetics so as to include the selected cosmetic raw material through the cosmetic raw material selection item 930. In the cosmetic raw material selection item 930, the cosmetic raw materials contained in each of the cartridges 151 may be listed and at least one cosmetic raw material may be selected. Alternatively, the cosmetic raw material selection item 930 lists the cosmetic raw materials and the cosmetic types of the finished or semi-finished products and the control unit 180 may also receive an instruction to select the cosmetic type.

According to one embodiment, the display unit 121 may be implemented as a touch screen to receive an input instruction of the cosmetic provision information.

According to another embodiment, the display unit 121 may receive an input instruction of the cosmetic provision information through a pointer (not illustrated) operated by the input unit 110.

According to another embodiment, the display unit 121 may receive an input instruction of the cosmetic provision information through a voice instruction received by the input unit 110.

However, this is merely illustrative and the mobile terminal 10 may receive the input instruction of the cosmetic provision information, transmit the input instruction thereof to the cosmetic dispenser 100, and the cosmetic dispenser 100 may receive the cosmetic provision information from the mobile terminal 10.

Accordingly, in FIG. 15, although it is described that the mobile terminal 10 receives the input information on the user information, the server 1 receives the environmental information, and the cosmetic dispenser 100 receives the input instruction of the cosmetic provision information, this is merely illustrative and is not limited to the type of a device that receives each piece of information. In other words, each of the mobile terminal 10, the server 1, and the cosmetic dispenser 100 constituting the cosmetic provision system may receive at least one of the input instruction of the user information, the environmental information, and the cosmetic provision information.

In addition, the order in which each device constituting the cosmetic provision system receives the input instruction of the user information, the environmental information, and the input instruction of the cosmetic provision information is not fixed and may vary depending on the communication state, the information input order of the user and the like.

Further, the cosmetic provision system may receive at least one of the user information, the environmental information, and the cosmetic provision information without receiving all the user information, the environmental information, and the cosmetic provision information.

The mobile terminal 10 may transmit the received user information to the server 1 (S17).

The cosmetic dispenser 100 may transmit the received cosmetic provision information to the server 1 (S19).

The server 1 may receive at least one of the user information, the environmental information, and the cosmetic provision information.

On the other hand, the cosmetic dispenser 100 may recognize the information on the ready-made cosmetics (S21).

When the cosmetic dispenser 100 recognizes the information on the ready-made cosmetics 1020, the cosmetic dispenser 100 may transmit the recognized information on the ready-made cosmetics to the server 1 (S23).

The server 1 may acquire cosmetic manufacturing method based on at least one of the received user information, the environmental information, the cosmetic provision information, and the information on ready-made cosmetics, which are received (S25).

The server 1 may transmit the acquired cosmetic manufacturing method to the cosmetic dispenser 100 (S27).

Alternatively, in a case where the cosmetic dispenser 100 may not recognize the information on the ready-made cosmetics (S21), the server 1 may acquire the cosmetic manufacturing method based on at least one of the user information, the environmental information and the cosmetic provision information, which are received (S27) and the acquired cosmetic manufacturing method may be transmitted to the cosmetic dispenser 100 (S31).

The cosmetic dispensing unit 150 of the cosmetic dispenser 100 may provide cosmetics based on the received cosmetic dispensing method (S33).

The cosmetic dispenser 100 may display the cosmetic information corresponding to the provided cosmetics (S35).

The sensing unit 140 of the cosmetic dispenser 100 may sense the remaining amount of the cartridge 151 (S37).

The first bi-directional communication unit 160 of the cosmetic dispenser 100 may transmit the remaining amount information on the sensed cartridge to the mobile terminal 10 (S39).

The wireless communication unit 11 of the mobile terminal 10 may receive the remaining amount information on the cartridge from the cosmetic dispenser 100 and the display unit 14 may output an alarm based on the remaining amount information on the received cartridge (S41).

As described above, the step of sensing the remaining amount of the cartridge and transmitting the cartridge remaining amount information may be performed after dispensing cosmetics as illustrated in FIG. 15 or may be performed before dispensing the cosmetics as illustrated in FIG. 7.

Alternatively, the control unit 180 may periodically control the remaining amount of the cartridge to transmit the remaining amount of the cartridge to the mobile terminal 10.

The present disclosure mentioned in the foregoing description may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk and optical data storage. In addition, the computer may include the control unit 180 of the terminal. Accordingly, the detailed description is intended to be illustrative, and not to limit the scope of the claims.

The scope of the present disclosure should be determined by the appended claims and their legal equivalents, not by the above description, and all changes coming within the meaning and equivalency range of the appended claims are intended to be embraced therein.

What is claimed is:

1. A cosmetic dispenser comprising:
   a communication unit;
   a control unit for acquiring at least one of user information and environment information through the communication unit and acquiring a cosmetic dispensing method based on at least one of the user information and the environment information; and
   a cosmetic dispensing unit having a plurality of cartridges for containing cosmetics and a discharge unit for discharging the cosmetics contained in the plurality of cartridges,
   wherein the control unit receives input information in which an amount of cosmetics to be provided is selected by a number of times of use,
   wherein the cosmetic dispensing unit dispenses each of the cosmetics contained in the plurality of cartridges in an amount corresponding to the number of times of use selected according to the input information,
   wherein the control unit controls to display on a display screen one or more input items for setting a cosmetic amount to be provided, and
   wherein the cosmetic dispensing unit determines the cosmetic amount for one time use or multiple time uses corresponding to the input information selecting the one or more input items.

2. The cosmetic dispenser according to claim 1, wherein the communication unit receives a cosmetic dispensing request signal from a mobile terminal and transmits cartridge remaining amount information to the mobile terminal.

3. The cosmetic dispenser according to claim 1, wherein the control unit receives a correction instruction for changing the cosmetics to be provided according to the cosmetic dispensing method and corrects the cosmetic dispensing method according to the correction instruction.

4. The cosmetic dispenser according to claim 1, wherein information on the cosmetics to be dispensed includes at least one of cosmetic types, cosmetic raw material information, and dispensed cosmetic usage methods.

5. The cosmetic dispenser according to claim 1, further comprising a sensing unit that senses at least one of a number of the cartridges, types of the cosmetics contained in the plurality of cartridges, a remaining amount of the cartridges, and an installation date of the cartridges.

6. The cosmetic dispenser according to claim 1, wherein the control unit discharges each of the cosmetics in the plurality of cartridges according to a makeup order.

7. The cosmetic dispenser according to claim 1, wherein the user information includes schedule information input to a mobile terminal, and the environment information includes weather information received from the mobile terminal.

8. A cosmetic dispensing system comprising:
   a mobile terminal for acquiring at least one of user information and environment information; and
   a cosmetic dispenser having a plurality of cartridges containing cosmetics and dispensing the cosmetics contained in the plurality of cartridges according to a cosmetic dispensing method acquired based on at least one of the user information and the environment information,
   wherein the mobile terminal receives input information in which an amount of cosmetics to be provided is selected by a number of times of use,
   wherein the cosmetic dispenser dispenses each of the cosmetics contained in the plurality of cartridges in an amount corresponding to the number of times of use selected according to the input information,
   wherein the mobile terminal displays one or more input items for setting a cosmetic amount to be provided, and
   wherein the cosmetic dispenser determines the cosmetic amount for one time use or multiple time uses corresponding to the input information selecting the one or more input items.

9. The cosmetic dispensing system according to claim 8, wherein the cosmetic dispenser receives a cosmetic dispensing request signal from the mobile terminal and transmits cartridge remaining amount information to the mobile terminal.

10. The cosmetic dispensing system according to claim 8, wherein the mobile terminal receives a correction instruction for changing the cosmetics to be provided according to the cosmetic dispensing method, and
    wherein the cosmetic dispenser dispenses the cosmetics according to the cosmetic dispensing method corrected according to the correction instruction.

11. The cosmetic dispensing system according to claim 8, wherein information on the cosmetics to be provided includes at least one of cosmetic types, cosmetic raw material information, and dispensed cosmetic usage methods.

12. The cosmetic dispensing system according to claim 8, wherein the cosmetic dispenser comprises a sensing unit that senses at least one of a number of the cartridges, types of the cosmetics contained in the plurality of cartridges, a remaining amount of the cartridges, and an installation date of the cartridges.

13. The cosmetic dispensing system according to claim 8, wherein the cosmetic dispenser discharges each of the cosmetics contained in the plurality of cartridges according to a makeup order.

14. The cosmetic dispensing system according to claim 8, wherein the user information includes schedule information input to the mobile terminal, and the environment information includes weather information received from the mobile terminal.

15. A method of operating a cosmetic dispenser, comprising:
    acquiring at least one of user information and environment information;
    acquiring a cosmetic dispensing method based on at least one of the user information and the environment information;
    receiving input information in which an amount of cosmetics to be provided is selected by a number of times of use; and
    dispensing the cosmetics according to the cosmetic dispensing method,
    wherein the dispensing of the cosmetics includes dispensing each of the cosmetics contained in the plurality of cartridges in an amount corresponding to the number of times of use selected according to the input information, and
    wherein the dispensing of the cosmetics includes displaying one or more input items for setting a cosmetic amount to be provided, and determining the cosmetic amount for one time use or multiple time uses corresponding to the input information selecting the one or more input items.

16. The method of operating a cosmetic dispenser according to claim 15, further comprising:
    receiving a cosmetic dispensing request signal from a mobile terminal; and
    transmitting cartridge remaining amount information to the mobile terminal.

17. The method of operating a cosmetic dispenser according to claim 15, further comprising:
    receiving a correction instruction for changing cosmetics to be provided according to the cosmetic dispensing method; and
    correcting the cosmetic dispensing method according to the correction instruction.

18. The method of operating a cosmetic dispenser according to claim 15, wherein information on the cosmetics to be provided includes at least one of cosmetic types, cosmetic raw material information, and dispensed cosmetic usage methods.

19. The method of operating a cosmetic dispenser according to claim 15, further comprising sensing at least one of a number of the cartridges, types of the cosmetics contained in the plurality of cartridges, a remaining amount of the cartridges, and an installation date of the cartridges.

20. The method of operating a cosmetic dispenser according to claim 15, wherein the dispensing of the cosmetics includes discharging each of the cosmetics contained in the plurality of cartridges according to a makeup order.

* * * * *